United States Patent
Brown et al.

(10) Patent No.: US 8,688,506 B2
(45) Date of Patent: Apr. 1, 2014

(54) DETERMINING TAILORED PRICING FOR RETAIL ENERGY MARKET

(75) Inventors: Deryl K. Brown, Southlake, TX (US); Michael R. Brannan, Lewisville, TX (US); Daniel Marzuola, Dallas, TX (US); Charles D. Hewitt, Colleyville, TX (US)

(73) Assignee: Hudson Energy Services LLC, Irving, TX (US)

( * ) Notice: Subject to any disclaimer, the term of this patent is extended or adjusted under 35 U.S.C. 154(b) by 1159 days.

(21) Appl. No.: 11/856,001

(22) Filed: Sep. 14, 2007

(65) Prior Publication Data

US 2009/0063367 A1    Mar. 5, 2009

Related U.S. Application Data

(60) Provisional application No. 60/967,036, filed on Aug. 31, 2007, provisional application No. 60/970,932, filed on Sep. 7, 2007.

(51) Int. Cl.
*G06Q 10/00* (2012.01)
*G06Q 30/00* (2012.01)
*G06F 17/00* (2006.01)
*G06G 7/00* (2006.01)
*G06Q 30/02* (2012.01)
*G06Q 30/06* (2012.01)

(52) U.S. Cl.
CPC ........ *G06Q 30/0206* (2013.01); *G06Q 30/0283* (2013.01); *G06Q 30/06* (2013.01)
USPC .......................................... 705/7.35; 705/400

(58) Field of Classification Search
CPC   G06Q 30/0206; G06Q 30/0283; G06Q 30/06
USPC ........................................ 705/412, 7.35, 400
See application file for complete search history.

(56) References Cited

U.S. PATENT DOCUMENTS

| | | | |
|---|---|---|---|
| 2003/0055677 A1* | 3/2003 | Brown et al. ..................... | 705/1 |
| 2003/0061091 A1 | 3/2003 | Amaratunga et al. | |
| 2004/0128266 A1 | 7/2004 | Yellepeddy | |
| 2004/0181492 A1* | 9/2004 | Rybakowski et al. .......... | 705/63 |

(Continued)

FOREIGN PATENT DOCUMENTS

| | | |
|---|---|---|
| JP | 2007-020314 | 1/2007 |
| KR | 10-2002-0066654 | 8/2002 |

OTHER PUBLICATIONS

International Search Report and Written Opinion of the International Searching Authority issued in International Application No. PCT/US2008/074923; Mar. 27, 2009; 8 pages.

(Continued)

*Primary Examiner* — Allen J Jung
(74) *Attorney, Agent, or Firm* — Fish & Richardson P.C.; Jonathan A. Solomon

(57) ABSTRACT

A method of pricing energy includes determining a price for supplying energy to a consumer over a future term based on at least a forecasted cost of energy and a forecasted energy usage of the consumer. The method further includes automatically determining an updated price for supplying energy based on at least the forecasted energy usage of the consumer used in initially determining the price. The method further includes outputting the updated price for supplying energy.

23 Claims, 47 Drawing Sheets

(56) References Cited

U.S. PATENT DOCUMENTS

2005/0187888 A1    8/2005  Sherman et al.
2005/0246220 A1   11/2005  Thomson et al.
2005/0283346 A1*  12/2005  Elkins et al. .................. 703/4

OTHER PUBLICATIONS

Office Action issued in related U.S. Appl. No. 11/856,005 on Apr. 30, 2009, 17 pages.

Office Action issued in U.S. Appl. No. 11/856,005 on Dec. 10, 2009, 21 pages.

Office Action issued in U.S. Appl. No. 11/856,005 on Jul. 14, 2010, 30 pages.

International Preliminary Report on Patentability issued in PCT/US2008/074923 on Mar. 2, 2010, 6 pages.

Office Action issued in U.S. Appl. No. 11/856,005 on Jan. 21, 2011, 23 pages.

* cited by examiner

Pricing Request Pricing - provided by

Pricing Results

Fixed Power

| Term | Price | Fee | Start Date | Created Date | Offer Sheet | Product Specific Documents |
|---|---|---|---|---|---|---|
| 12 | 0.09410 | 0.00400 | 08/19/2008 | 8/31/2007 8:29 AM | ☒ | Presentation Sheet: ☒ |
| 24 | 0.09450 | 0.00400 | 08/19/2008 | 8/31/2007 8:29 AM | ☒ | Master Agreement: ☒ |
| 36 | 0.09400 | 0.00400 | 08/19/2008 | 8/31/2007 8:29 AM | ☐ | |
| 48 | 0.09340 | 0.00400 | 08/19/2008 | 8/31/2007 8:29 AM | ☐ | |
| 52 | 0.09280 | 0.00400 | 08/19/2008 | 8/31/2007 8:29 AM | ☐ | |

[Generate Documents]

MCPE

| Term | Adder | Fee | Start Date | Created Date | Offer Sheet | Product Specific Documents |
|---|---|---|---|---|---|---|
| 12 | 0.01900 | 0.00400 | 08/19/2008 | 8/31/2007 8:29 AM | ☐ | Presentation Sheet: ☐ |
| 24 | 0.01900 | 0.00400 | 08/19/2008 | 8/31/2007 8:29 AM | ☐ | Master Agreement: ☐ |
| 36 | 0.01900 | 0.00400 | 08/19/2008 | 8/31/2007 8:29 AM | ☐ | |
| 48 | 0.01900 | 0.00400 | 08/19/2008 | 8/31/2007 8:29 AM | ☐ | |
| 52 | 0.01900 | 0.00400 | 08/19/2008 | 8/31/2007 8:29 AM | ☐ | |

[Generate Documents]

Hybrid

| Term | Fixed Product | Sales Price | Unit Margin | Fixed % | Index Product | Adder | Unit Margin |
|---|---|---|---|---|---|---|---|
| 12 Month | Fixed Power (ER) | 0.09410 | 0.00400 | % | MCPE Index (ER) | 0.01900 | 0.00400 |

Sales Report - Sales Reporting - Hudson Sales Partner Portal - provided by

File Edit View Favorites Tools Help

Address https://www.gsnnes.com/PartnerPortal/SalesReport.aspx

Sales DashBoard   Outlook Report   Wins Report   Delete Report   Partner Payments   Sales Report   Margin Report

Monthly Actuals

| Month | Deals | Avg. kWh/yr | Annual kWh | Avg Term | Term kWh |
|---|---|---|---|---|---|
| January-2007 | | | | | |
| February-2007 | | | | | |
| March-2007 | | | | | |
| April-2007 | | | | | |
| May-2007 | | | | | |
| June-2007 | | | | | |
| July-2007 | | | | | |
| August-2007 | | | | | |
| Total | | | | | |

Monthly Plan

| Month | Deals | Avg. kWh/yr | Annual kWh | Avg Term | Term kWh |
|---|---|---|---|---|---|
| January-2007 | | | | | |
| February-2007 | | | | | |
| March-2007 | | | | | |
| April-2007 | | | | | |
| May-2007 | | | | | |
| June-2007 | | | | | |
| July-2007 | | | | | |
| August-2007 | | | | | |
| Total | | | | | |

| River - Auto Price Batch List - provided by | | | | | | | | | |
|---|---|---|---|---|---|---|---|---|---|

File Edit View Favorites Tools Help

Back ▾ | Address: https://www.insidethes.com/River/AutoPriceBatchList.aspx

*river*

| Home | Pricing Requests | ▲ | Usage Library | ▲ | Documents | ▲ | Enrollments/Billing | ▲ | Forecasting/Scheduling | ▲ | Administration |

Auto Price Batch List

Execute Batch

| Id | Monthly COGS Version ID | Customer | Start Date | End Date | Result | Result Description | Successful | Errored | Failed | Created Date | Action |
|---|---|---|---|---|---|---|---|---|---|---|---|
| 13178 | 404 | | 8/31/2007 3:19 PM | 8/31/2007 3:19 PM | Completed Successfully | Batch completed successfully | 2 | 0 | 0 | 8/31/2007 3:19 PM | View |
| 13177 | 404 | | 8/31/2007 3:18 PM | 8/31/2007 3:18 PM | Completed Successfully | Batch completed successfully | 3 | 0 | 0 | 8/31/2007 3:18 PM | View |
| 13176 | 404 | | 8/31/2007 2:19 PM | 8/31/2007 2:19 PM | Completed Successfully | Batch completed successfully | 2 | 0 | 0 | 8/31/2007 2:19 PM | View |
| 13175 | 404 | | 8/31/2007 2:15PM | 8/31/2007 2:15PM | Completed Successfully | Batch completed successfully | 2 | 0 | 0 | 8/31/2007 2:15PM | View |
| 13174 | 404 | | 8/31/2007 2:10PM | 8/31/2007 2:10PM | Completed Successfully | Batch completed successfully | 1 | 0 | 0 | 8/31/2007 2:10PM | View |
| 13173 | 404 | | 8/31/2007 2:07PM | 8/31/2007 2:07PM | Completed Successfully | Batch completed successfully | 3 | 0 | 0 | 8/31/2007 2:07PM | View |
| 13172 | 404 | | 8/31/2007 2:06PM | 8/31/2007 2:06PM | Completed Successfully | Batch completed successfully | 3 | 0 | 0 | 8/31/2007 2:06PM | View |
| 13171 | 404 | | 8/31/2007 2:03 PM | 8/31/2007 2:03 PM | Completed Successfully | Batch completed successfully | 1 | 0 | 0 | 8/31/2007 2:03 PM | View |
| 13170 | 404 | | 8/31/2007 1:43 PM | 8/31/2007 1:43 PM | Completed Successfully | Batch completed successfully | 6 | 0 | 0 | 8/31/2007 1:43 PM | View |
| 13169 | 404 | | 8/31/2007 1:41 PM | 8/31/2007 1:41 PM | Completed Successfully | Batch completed successfully | 2 | 0 | 0 | 8/31/2007 1:41 PM | View |

3052 Total Records | Page 1 of 306 pages | 10 Records per Page

| Product | Min Volume | Max Volume | Unit Margin | Auto Price Hours Adjustment |
|---|---|---|---|---|
| FP_PWR_ER | 0 | 1,999,999 | 0.00400 | 0 |
| FP_PWR_ER | 2,000,000 | 4,999,999 | 0.00350 | 0 |
| FP_PWR_ER | 5,000,000 | 9,999,999 | 0.00300 | 0 |
| FP_PWR_ER | 10,000,000 | 2,147,483,647 | 0.00250 | 0 |
| FP_PWR_NY | 0 | 1,000,000 | 0.01500 | 24 |
| FP_PWR_NY | 1,000,001 | 2,300,000 | 0.01000 | 48 |
| FP_PWR_NY | 2,000,001 | 4,000,000 | 0.01000 | 48 |
| FP_PWR_NY | 4,000,001 | 2,147,483,646 | 0.00800 | 0 |
| IP_LBMP_NY | 0 | 2,147,483,647 | 0.00500 | 0 |
| IP_MCPE_ER | 0 | 1,999,999 | 0.00400 | 0 |
| IP_MCPE_ER | 2,000,000 | 4,999,999 | 0.00350 | 0 |
| IP_MCPE_ER | 5,000,000 | 9,999,999 | 0.00300 | 0 |
| IP_MCPE_ER | 10,000,000 | 2,147,483,647 | 0.00250 | 0 |

Default Margin Adjustments

| Product | Min Third Party Fee | Max Third Party Fee | Unit Margin Adjustment |
|---|---|---|---|
| FP_PWR_NY | 0.000026 | 0.000050 | -0.000050 |
| FP_PWR_NY | 0.00051 | 0.000075 | -0.000025 |
| IP_LBMP_NY | 0.00000 | 9.99999 | 0.00000 |

FIG. 5J

| Forecasted Month | Forecasted Year | On Peak Usage Kwh | Off Peak Usage Kwh | Peak |
|---|---|---|---|---|
| 8 | | 2 | 1,658 | 1,402 | 6 |
| 9 | | 2 | 1,359 | 1,305 | 6 |
| 10 | | 2 | 1,091 | 1,077 | 5 |
| 11 | | 2 | 939 | 800 | 4 |
| 12 | | 2 | 706 | 734 | 3 |
| 1 | | 2 | 710 | 598 | 2 |
| 2 | | 2 | 710 | 628 | 3 |
| 3 | | 2 | 759 | 684 | 2 |
| 4 | | 2 | 939 | 845 | 4 |
| 5 | | 2 | 1,272 | 1,029 | 5 |
| 6 | | 2 | 1,386 | 1,313 | 6 |
| 7 | | 2 | 1,579 | 1,451 | 6 |
| 8 | | 2 | 1,662 | 1,397 | 6 |
| 9 | | 2 | 1,265 | 1,379 | 5 |
| 10 | | 2 | 1,136 | 972 | 5 |
| 11 | | 2 | 935 | 804 | 4 |
| 12 | | 2 | 699 | 745 | 3 |
| 1 | | 2 | 710 | 598 | 2 |
| 2 | | 2 | 747 | 641 | 3 |
| 3 | | 2 | 722 | 717 | 2 |
| 4 | | 2 | 989 | 817 | 4 |
| 5 | | 2 | 1,222 | 1,090 | 5 |
| 6 | | 2 | 1,386 | 1,331 | 6 |
| 7 | | 2 | 1,647 | 1,361 | 6 |
| 8 | | 2 | 1,520 | 1,548 | 6 |

| Document Number | Customer Legal Name | Signed Date | Start Date | End Date | Context | Extract File Name | Number of Premises (New Enrollment) | Number of Premises (Adds) | Number of Premises (Enrollment Sent) | Number of Premises (On the Contract) | View |
|---|---|---|---|---|---|---|---|---|---|---|---|
| | | 8/27/2007 | 9/21/2007 | 3/7/2011 | ERCOT | Multiple Enrollment Files | | | 13 | 21 | 🔍 |
| | | 8/29/2007 | 9/21/2007 | 9/17/2012 | ERCOT | | | | 2 | 4 | 🔍 |
| | | 7/31/2007 | 8/24/2007 | 9/25/2009 | ERCOT | | | | 0 | 5 | 🔍 |
| | | 3/12/2007 | 9/25/2007 | 11/7/2008 | ERCOT | Multiple Enrollment Files | | | 8 | 7 | 🔍 |
| | | 8/2/2007 | 9/25/2007 | 9/8/2008 | ERCOT | 267_08.23.2007.EnrollmentExtract.csv | | | 1 | 2 | 🔍 |
| | | 4/18/2007 | 9/26/2007 | 9/28/2010 | ERCOT | | | | 0 | 4 | 🔍 |
| | | 7/13/2007 | 9/27/2007 | 8/4/2012 | ERCOT | Multiple Enrollment Files | | | 4 | 5 | 🔍 |

FIG. 50

| Files Name | Created By | Created Date | Download |
|---|---|---|---|
| 117_08.31.2007.RES.WelcomePackageBatch.zip | | 8/31/2007 2:41:00 PM | |
| 116_08.30.2007.RES.WelcomePackageBatch.zip | | 8/30/2007 2:27:19 PM | |
| 115_08.29.2007.RES.WelcomePackageBatch.zip | | 8/29/2007 3:42:14 PM | |
| 114_08.28.2007.RES.WelcomePackageBatch.zip | | 8/28/2007 2:06:27 PM | |
| 113_08.28.2007.RES.WelcomePackageBatch.zip | | 8/28/2007 9:06:16 PM | |
| 112_08.24.2007.RES.WelcomePackageBatch.zip | | 8/24/2007 3:05:02 PM | |
| 111_08.23.2007.RES.WelcomePackageBatch.zip | | 8/23/2007 2:45:59 PM | |
| 110_08.22.2007.RES.WelcomePackageBatch.zip | | 8/22/2007 4:00:33 PM | |
| 109_08.21.2007.RES.WelcomePackageBatch.zip | | 8/21/2007 2:43:42 PM | |
| 108_08.21.2007.RES.WelcomePackageBatch.zip | | 8/21/2007 9:20:44 PM | |

FIG. 5Q

DETERMINING TAILORED PRICING FOR RETAIL ENERGY MARKET

CLAIM OF PRIORITY

This application claims priority under 35 USC §119(e) to U.S. Patent Application Ser. No. 60/967,036, filed on Aug. 31, 2007, and U.S. Patent Application Ser. No. 60/970,932, filed on Sep. 7, 2007 the entire contents of which are hereby incorporated by reference.

CROSS-REFERENCE TO RELATED APPLICATIONS

This application is related to co-pending application entitled "Automatically Refreshing Tailored Pricing for Retail Energy Market", application Ser. No. 11/856,005, filed on Sep. 14, 2007, the entire contents of which are hereby incorporated by reference.

TECHNICAL FIELD

This disclosure relates to computer systems and methods and, more particularly, to methods, systems, and software for pricing energy for a retail market and communicating the pricing.

BACKGROUND

A typical electricity energy market includes power generating companies (PCGs), who generate electricity; wholesalers, who purchase electricity in bulk directly from the utilities; retailers, who sell electricity to and service consumers; and consumers, who purchase and consume electricity. In many markets, independent system operators (ISOs) and regional transmission organizations (RTOs) exist to oversee the reliable and efficient transmission of electricity from the utilities to the customers. In some markets, retailers pair with a qualified scheduling entity (QSE) who matches the retailer's load with generation from the PCGs, and schedules the delivery of power, often through the ISO. Retailers sometimes engage salespeople to seek out new customers. These sales people may work directly for the retailer or may be third-party brokers.

SUMMARY

The disclosure provides various embodiments of systems, methods, and software for managing product development processes. In one embodiment, a method of pricing energy includes determining a price for supplying energy to a consumer over a future term based on at least a forecasted cost of energy and a forecasted energy usage of the consumer. The method further includes automatically determining an updated price for supplying energy based on at least the forecasted energy usage of the consumer used in initially determining the price. The method further includes outputting the updated price for supplying energy.

In another embodiment, a system for pricing energy includes a pricing engine. The pricing engine is operable to determine a price for supplying energy to a consumer over a future term based on at least a forecasted cost of energy and a forecasted energy usage of the consumer. The pricing engine is further operable to automatically determine an updated price for supplying energy based on at least the forecasted energy usage of the consumer used in initially determining the price. The system also includes an interface that is operable to output the price for supplying energy and the updated price for supplying energy.

Each of the foregoing—as well as other disclosed—example methods and systems may be computer implementable and embodied in software. Moreover, some or all of these aspects and other aspects may be further included in respective systems and software for transactable pricing.

For the foregoing methods, systems, and software, determining a price for supplying energy to a consumer over a future term may be based on at least the forecasted cost of energy, the forecasted energy usage of the consumer and a margin. Determining the updated price for supplying energy may be based on the forecasted energy usage of the consumer used in initially determining the price and at least one of a changed forecasted cost of energy or a changed margin. The forecasted cost of energy may include both a raw cost of energy and a cost to provide the energy to the consumer. Automatically determining an updated price for supplying energy may include determining an updated price for supplying energy without updating the forecasted energy usage. Determining a price for supplying energy may include determining a fixed price per unit of energy over the term. Determining a price for supplying energy may include determining a hybrid price for supplying energy including a fixed price component having a fixed price per unit of energy over the term and an indexed component having a price determined based on a market price of energy contemporaneous with consumption of the energy. The systems, methods, and software may also include receiving data representative of the consumer's energy usage; automatically generating the forecasted energy usage of the consumer based on the consumer's energy usage. Determining a price for supplying energy to the consumer over the future term may be performed automatically.

Determining a price for supplying energy to a consumer over a future term based on at least a forecasted cost of energy and a forecasted energy usage of the consumer may also include determining multiple prices for supplying energy to the consumer. Each price may be associated with a different pricing scenario. Automatically determining an updated price for supplying energy based on at least the forecasted energy usage of the consumer used in initially determining the price may also include automatically determining a plurality of updated prices for supplying energy to the consumer, each updated price associated with a different pricing scenario. Outputting the price for supplying energy may include offering to contract to supply energy to the consumer at the price.

The pricing engine may be operable to determine a price for supplying energy to a consumer over a future term based on at least the forecasted cost of energy, the forecasted energy usage of the consumer and a margin. The pricing engine may be further operable to determine the updated price for supplying energy based on the forecasted energy usage of the consumer used in initially determining the price and at least one of a changed forecasted cost of energy or a changed margin. The forecasted cost of energy may include both a raw cost of energy and a cost to provide the energy to the consumer. Automatically updating the price for supplying energy may include updating the price for supplying energy without updating the forecasted energy usage.

The pricing engine may be further operable to receive data representative of the consumer's energy usage; automatically generate the forecasted energy usage of the consumer based on the consumer's energy usage; and automatically determine the price for supplying energy to the consumer over the future term. The interface may be operable to output the price for supplying energy as an executable contract to supply energy to the consumer at the price. The pricing engine may be further operable to automatically determine a plurality of prices for supplying energy. Each price may be determined for a different energy consumer and based at least on a forecasted cost of energy and a forecasted energy usage of the consumer.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
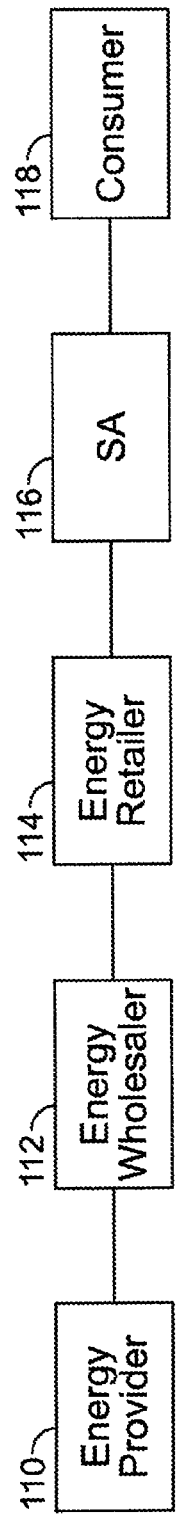
FIG. 1 illustrates an example of the parties that participate in an energy market, and their relationships to one another.

FIG. 1 illustrates one example of the parties involved in producing and selling energy in a market. One or more of the illustrated parties may be omitted or merged with others and/or additional parties included without departing from the scope of the present disclosure. Referring to FIG. 1, a power generating company (PCG) 110 generates or otherwise produces energy. The energy may be, for example, electricity, natural gas, oil, fuel, hydrocarbon byproducts, or other suitable forms of energy. An energy wholesaler 112 buys energy from the PCG 110 and sells to the retail or other suitable market. An energy retailer 114 buys energy from the wholesaler 112 and resells to consumers 118 through a sales agent (SA) 116. There are many variations that may exist. In other embodiments, for example, the retailer 114 and SA 116 may be a single party.

Figure 2:
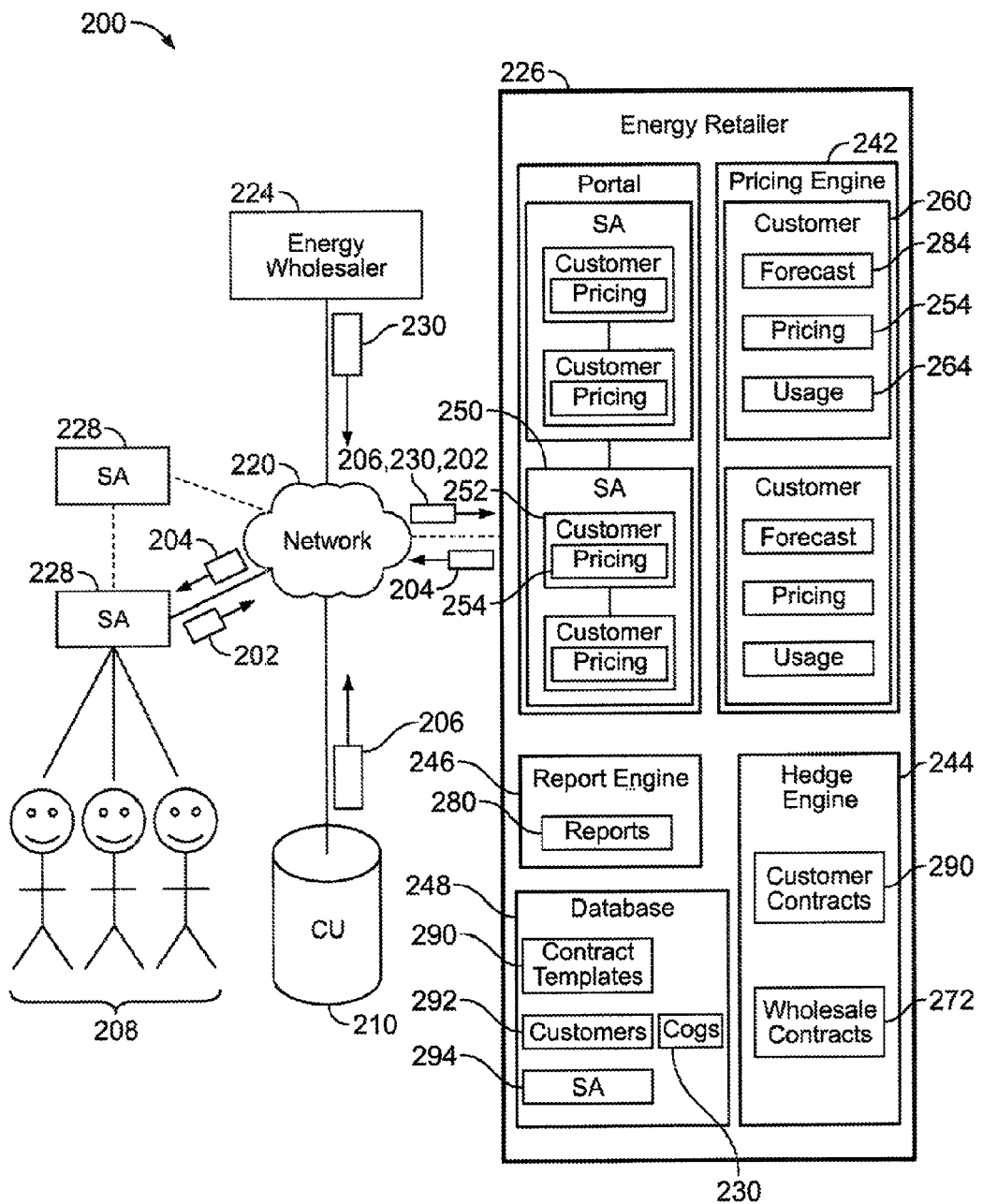
FIG. 2 is a block diagram of an example: system for pricing energy for retail market and communicating pricing.

Turning now to FIG. 2, which is a block diagram of an example system for pricing energy for retail market and communicating pricing, system 200 includes SAs 228, a wholesaler system 224, and a retailer system 226, all of which may be connected through a network 220. In this embodiment, the retailer 114 sells to consumers 118 via sales agents 116. In this example, the energy is electricity. The system 200 may be used for selling energy at other levels and/or multiple levels.

Network 220 facilitates wireless or wireline communication between computers and/or computer systems, such as between energy wholesaler 224 and energy retailer 226 Indeed, while illustrated as one network, network 220 may be a logically segregated or distributed network without departing from the scope of this disclosure, so long as at least portion of network 220 may facilitate communications between senders and recipients of requests and results. In other words, network 220 encompasses any internal and/or external network, networks, sub-network, or combination thereof operable to facilitate communications between various computing components in system 200. Network 220 may communicate, for example, Internet Protocol (IP) packets, Asynchronous Transfer Mode (ATM) cells, voice, video, data, and other suitable information between network addresses. Network 220 may include one or more local area networks (LANs), radio access networks (RANs), metropolitan area networks (MANs), wide area networks (WANs), all or a portion of the global computer network known as the Internet, and/or any other communication system or systems at one or more locations.

The retailer system 226 generally may include a pricing engine 242 and a portal 240. The portal 240 may receive customer information 202 from a sales associate 228. The customer information 202 may include usage information 264 or may be used to obtain the usage information from a customer usage information system 210. Based on the usage information 264, pricing engine 242 may forecast (at 284) the usage for the customer for a period of time, for example, up to a maximum contract term or for another period of time. This forecast 284 may be stored for the customer and used in future pricing calculations. Based at least in part on the forecast 284 and the cost of goods sold data (COGS) 230, which may be obtained periodically from the energy wholesaler 224, the pricing engine 242 may calculate a tailored transactable price 204 that is forwarded to the sales agent 228. The tailored transactable price 204 may be tailored to the usage pattern of the customer and form the basis of an offer to contract energy for a certain time period. After the customer information 202 and usage information 206 has been obtained and verified, retailer system 226 may communicate transactable prices 204 on demand, periodically, based on customer preferences, when warranted by changes in COGS 230, the margin of the retailer 114 and/or other changes, and/or at other intervals. In some embodiments, a tailored transactable price 204 may be requested by an SA 228 and returned to the SA 228 within a few minutes, or even a few seconds. In some embodiments, along with the tailored transactable price 204, an executable contract for energy services may also be transmitted. Some or all of these steps may be performed automatically.

An advantage may be scalability in providing quick tailored transactable pricing for a large number of customers. This has the advantage of increasing customer yields for sales agents and retailers. Additionally, an advantage is that customer pricing may be done more efficiently, which allows retailers to reduce resources that are dedicated to pricing and focus those resources on other parts of the business. Various embodiments may have none, some, or all of these advantages.

Turnings back to FIG. 2, an energy retailer system 226 generally includes a portal 240, a pricing engine 242, a hedge engine 244, a report engine 246, and a database 248.

The portal 240 may be a combination of computer software and hardware that may provide an interface between the energy retail system 226 and its users. The users of the system may include sales associates 228, customers 208, and internal users or administrators (not shown). Through portal 240, the SA 228 or other user may, among other things, perform an initial setup for a customer by providing customer information 202 and may request pricing for the customer. The portal 240 may accept customer information 202 and store it in database 248 in a customer table 292. The customer information 202 may include the usage history 206 for a customer 208 and other information. Some examples of other information include identifying information for the consumer, the number of premises that energy will be supplied to, the geographic locations of the premises, and other information. In some embodiments, the usage history 206 may be independently obtained by the portal 240 from a customer usage database 210 that may be maintained by the PCG 110 or other entity. For example, the PCG 110 may provide a downloadable file containing the usage data or may provide other access, including displaying the usage history on a web page. In instances where the usage data is displayed on a web page, the energy retail system 226 can be configured to capture the usage data from the web page and process it into a format usable by the components of the energy retail system 226. The portal 240 may retrieve automatically the usage history 206 from customer usage database 210 in response to receiving customer information 202. The portal 240 also may be used to display and/or organize SA data 250 for each SA 228. Each SA data 250 may include customer data 252 for customers 208 associated with the SA 228, and current pricing 254 for each customer 208.

As described in more detail below, the current pricing 254 may be tailored to the specific customer 208, for example taking into account one or more of the cost to transport the electricity to the customer 208, the forecast usage 260 by the customer 208, the peak usage by the customer 208, the credit history of the customer 208, and other factors. The current pricing 254 may be a tailored transactable pricing that is capable of acceptance by the customer 208 as part of a binding contract to sell and/or provide the agreed amount of energy during the agreed period at the current pricing 254. Each SA 228 may create multiple pricing scenarios for the same client 208 and may associate a SA fee charged by the SA 228 with each different pricing scenario. Each pricing scenario may be periodically updated with current pricing 254. The multiple pricing scenarios provide a customer 208 with options to compare when contracting For energy. The pricing scenarios may be for different contract periods, start dates, pricing models (such as fixed and indexed as described below), and/or other scenarios. In certain embodiments, the pricing scenarios may also include pricing for modifying or changing an existing contract. Each SA 228 may access the portal 240 to view the data and pricing for the customers 208 associated with the SA 228. The portal 40 may be accessed via a secure logon or otherwise.

In addition, the portal 240 or other part of the retailer system 226 may transmit an electronic mail message (email), instant message, or otherwise automatically contact the SA 228 or customer 208 in response to changes to pricing data 254. For example, the portal 240 or system 226 may automatically transmit an email to an SA 228 in response to any change in pricing, in response to upward or downward pricing information, in response to current pricing meeting a pre-defined or other point or threshold, in response to current pricing meeting a buy point or contract modification point, or in response to other suitable event. Many other events may be used in various embodiments to trigger an automatic contact to the SA 228.

The portal 240 may also, at the request of the SA 228 or otherwise, generate a contract for the customer 208 based on the pricing data 254 and a contract template 290, which may be stored in database 248. The contract may contain the pricing data 254, a selected option within the pricing data 254, or a price based on the pricing data 254. The pricing in the contract may be transactable in that the contract is capable of immediate or later acceptance by the customer 208 without any further approval from the retailer 114, without a later and more definite determination of pricing, or with reduced, simplified, or minimized approval. For example, a simple approval may only ensure that the customer returned the contract within a certain time period. The contract may be generated upon acceptance of the pricing or may be emailed or otherwise communicated upon the pricing meeting a value or threshold. In addition, generation and acceptance of the contract could be immediate where the pricing meets a value agreed by the parties to be one at which a binding agreement would be automatically entered.

The pricing engine 242 may be a combination of computer software and hardware that makes determinations and performs calculations related to tailored transactable prices for customers. The system 226 may use the pricing engine 242 to automatically push current pricing to sales agents 228 and potential customers 208. The system 226 may also provide the current pricing for energy contracts as a legal offer in a transactable form. The pricing engine 242 may receive a number of inputs including the usage history 206 for a consumer 208, the proposed contract period, the proposed service start date, the SA fees, the retailer margin, and the COGS 230. The pricing engine 242 may determine a forecast 284 to facilitate the process of determining a tailored transactable price 204. Other embodiments may have additional functionally, may omit certain functions and/or may have disparate functions.

The usage history 206 is one or more files that contain information related to the past energy demands of a customer. Overall demand for energy may vary during the course of a day. For example, from 8:00 AM to 5:00 PM demand for energy may be at its peak. Because of the higher demand, prices for energy during those peak times may be higher. Thus, pricing is usually calculated based on-peak and off-peak usage. To determine the on and off peak usage of a customer, the usage data 206 may include information related to the total energy used in a given time interval, the maximum usage in a given time interval, and how the energy usage is distributed throughout the time interval. For example, usage history 206 may include the total energy used over a two-year period expressed in monthly intervals as kilowatt hours (kWh) per month. The interval may be small, such as 15 minutes, in which case the total energy used in a two-year period may be kWh per quarter hour. The interval may be any time period, including, but not limited to, daily, weekly, hourly, and semi-annually. The usage history 206 may also include for each month the maximum energy consumed on any day during each month, such as 196 kWh in April, and 210 kWh in May. The usage history 206 may also include a load profile describing how the energy usage is distributed throughout the time energy. The load profile may be determined by matching a customer 208 to one of several standard profiles that have been determined by ISOs or RTOs, based on, among other things, the industry, the size, and/or the location of the customer 208. The load profile may indicate how the energy usage is distributed over a period, such as a year, using small intervals, such as 15 minutes. In some embodiments, certain customers may have equipment that measures usage at small enough intervals such that matching to a standard profile may not be needed. A customer 208 may have one or more sites. Each of these sites may have usage data associated with it.

The forecast 284 may be determined from the on and off peak usage of a customer 208. The usage data 206 may be used to determine the amount of energy used in hourly increments by combining a load profile with other usage data and adjusting the result to average usage per hour. The usage per hour may be used to determine the amount of energy consumed during peak and non-peak times. By extrapolating the peak and off-peak usage, a forecast 208 may be determined for a specified maximum period, such as five years. The maximum period may be determined by the maximum period a retailer is willing to contract energy with any customer. The pricing engine 242 may store the forecast 284. In some embodiments, the forecast 284 may not have to be calculated again for the customer. The forecast 284 may be recalculated after the usage data 206 for a customer is refreshed. The usage data 206 may need to be refreshed if the characteristics of a customer 208 change and/or after a certain amount of time has elapsed since the usage data 206 was last loaded for a customer 208.

After the forecast 284 has been generated for a customer 208, a tailored transactable price 204 may be determined for the customer 208. Generally, there are two types of pricing models, fixed and indexed. Some embodiments use other pricing models that are different from or are combinations of the fixed and indexed pricing models. The fixed pricing model is based on a customer agreeing to pay the same price regardless of market conditions. An indexed pricing model is based on a customer agreeing to pay some amount (in one example, a fixed amount) over an index that tracks energy prices, and may be based on a market clearing price for energy (MCPE). In the fixed pricing model, the risks of energy prices decreasing and increasing are respectively wholly born by the customer 118 (risk of decrease) or the wholesaler 112/retailer 114 (risk of increase), respectively. In the indexed pricing model, the risk of energy prices decreasing or increasing is shared by the customer 118 and the wholesaler 112/retailer 114.

In determining fixed prices, the pricing engine 242 first takes a subset of the forecast 284 that corresponds to the period that the customer 208 proposes as an energy contracting period, which is the proposed start and term of a contract for energy. This period may be limited by the maximum period for which the retailer 114 is willing to contract. The retailer 114 may also determine the credit history of a customer and limit the contracting period based on the credit history. The wholesaler system 224 may generate or otherwise provide cost of goods data (COGS) 230 based on market information. The COGS 230 may include wholesale pricing information for the energy being sold. COGS 230, expressed in some embodiments in dollars per kWh, may include the costs to deliver energy to a particular location. COGS 230 may vary according to, among other things, location, peak and off peak usage, month in which the energy is being delivered and/or other things. The pricing engine 242 may apply the COGS 230 to the subset of the forecast usage 284 corresponding to the contract period to determine a peak and an off peak cost. A combination cost may be determined from the weighted average of the peak price and the off peak costs. A tailored transactable price may be determined from the combination cost of energy by applying adders. The adders may include the fee of the sales agent, the margin of the retailer, and/or other fees and taxes. The other fees and taxes may vary by the specific market and/or customer location.

Turning now to indexed prices, an indexed price may be expressed as a fixed price amount added to a market index, such as for example $0.07 per kWh over the MCPE. The fixed price portion of the indexed price may be determined by adding adders to the costs associated with line loss. Line loss may depend on the location of the customer and the amount of energy transmitted. The adders are similar to the adders in the fixed pricing model.

The report engine 246 may be a combination of computer software and hardware that generates reports for users of the system 200. The report engine 46 may generate one or more reports 80. The reports 80 may be retailer reports on, for example, customer contracts entered and wholesale contracts entered. The reports may also include sales agent or customer reports. For example, a report may describe the total sales on a monthly basis, an annualized volume of sales comparing actual to planned, contribution margins, or may itemize the number of customers contracted per month of a the past year. There are many variations of reports that may be implemented by report engine 246.

The hedge engine 244 may be a combination of computer hardware and software that may provide reports to users of the system 226 to facilitate hedging in the contracts in the wholesale market. The hedge engine 244 may include customer contracts 270 and wholesale contracts 272. The hedge engine 244 may provide a report listing the contracts that need to be purchased on the wholesale market. The hedge engine 244 may also provide reports indicating the margins that may be needed on contracts. A user may use the information contained in the reports to decide which wholesale contracts to execute. The reports and the decisions based on the report may be automated within hedge engine 244

The database 248 may be a combination of computer hardware and software that stores and organizes information used by retailer system 226. In one embodiment, the database 248 may store contract templates 290, detailed customer data 292 and detailed broker SA data 294. The contract templates 290 may include the necessary terms to form a binding contract absent pricing and customer identification which may be merged with the template data upon contract generation by the portal 240 or system 226. The detailed customer information 292 may include customer name, address, locations of energy usage, and other suitable information. Customer usage 264, forecast 284, and credit reports, and other information may be stored in the detailed customer data 292. The detailed SA data 294 may include SA name, address, customers, sales levels, and histories. Other suitable information on the SA 228 or his or her customers may also be stored in the detailed broker data 294.

Data and files described above in connection with elements of system 226 may be centrally stored in the database 248, stored in other elements or systems, or otherwise. Thus, the modules of system 226 may access, but not store, the files and data in database 248. The described functionally may be automatic or automatically preformed, or may be preformed with user interaction. The engines and modules may perform or be used to perform the described functionality of other engines and modules. In an embodiment where the SA 228 is omitted, the customer 208 may directly use the system. The system 226 may allow SAs 228 to post proposed pricing for a customer to the retailer, and the retailer to accept the proposed pricing to form a binding contract, the remainder of the contract terms having been agreed.

In operation, SA 208 may have contact with a customer 208. Else customer 208 may be interested in contracting for energy over a period of two years for example. The SA 228 may access retailer system 226 through portal 240 to determine the pricing for a retailer 114 implementing system 226. Based on the credentials of SA 228, the portal 240 may access database 248 to retrieve the customers 208 that are associated with the SA 228. The SA 228 may be presented with a view of the customers 208 of the SA 228, and with options to perform other tasks. The SA 228 may choose to setup a new customer prospect based on the information of the customer 208. The information for the customer 208 may be inputted through a graphical user interface (GUI). The SA 228 may upload the usage data associated with the customer 208. The usage data 206 may alternatively be automatically obtained after the uploading of customer data 202 by system 226 from customer usage database 210. In some embodiments, the customer data 202 and/or usage data 206 may be manually verified.

After the customer data 202 and customer usage data 206 is received by the system 226, the pricing engine 242 may generate and store forecast usage data 260. The pricing engine 242 may generate current pricing 254 based on the COGS 230 that are stored and the usage data 264 for the customer 260. In some embodiments, the current pricing 254 may be communicated (at 204) to the SA 228 and customer 208 within a short time after the customer data 202 is uploaded. The SA 228 may also setup a notification in system 226, whereby system 226 may notify the SA 228 and/or customer 208 that the current pricing 260 has changed, or that the current pricing 260 has met some threshold value.

Periodically system 226 may receive new COGS 230 from the wholesaler 224. These new COGS 230 may not warrant an update in the current pricing 254. At certain times newly received COGS 230 may prompt a change in current pricing 254. Other changes within the system 226 may also prompt changes in current pricing 254, such as the changes in the margins. A margin is the net of costs of goods sold and sales price. Users of the system 226, such as administrators or others internal to the retailer 114, may have access to update the margins. The system 226 may be configured to allow users to specify customers matching certain criteria to get a certain margin adjustment. The criteria may be based on geographic region, product type (e.g., fixed or indexed), usage, and/or a host of other criteria. For example, margins may be adjusted based on the commission of an SA 228. Implementing margin adjustment may allow the retailer 114 to react quickly to the competitive marketplace. Furthermore, the system 226 may implement a default margin that is applied to customers meeting certain criteria similar to the criteria described with respect to updating margins. Margins may also be updated based on determinations made by the hedge engine 244.

When changes to COGS 230 or margins warrant, the system 226 may retrieve the forecast usage data 284 for one or more customers 208 whose pricing may have changed and may apply the new COGS 230 and/or new margins to update the current pricing 254. As previously mentioned, an SA 228 and/or customer 208 user may have a notification set to inform them of pricing changes.

The SA 228, wholesaler 224, retailer 226, and customer usage database 210 may each comprise one or more electronic computing devices operable to receive, transmit, process, and store data associated with system 200. Each computer is generally intended to encompass any suitable processing device. Each computer may be any computer or processing device such as, for example, a blade server, a general-purpose personal computer (PC), Macintosh, workstation, Unix-based computer, or any other suitable device. In other words, the present disclosure contemplates computers other than general purpose computers, as well as computers without conventional operating systems. Each computer may be adapted to execute any operating system including Linux, UNIX, Windows Server, or any other suitable operating system. According to one embodiment, each computer may also include or be communicably coupled with a web server and/or a mail server.

Each computing device may have memory and a processor. The memory may also be remote and connected through a network, such as network 220. The memory is computer readable media suitable for storing computer program instructions and data. The memory may be any form of non volatile memory, media and memory devices, including by way of example random access memory (RAM), read-only memory (ROM), or other memory devices, such as, e.g., EPROM, EEPROM, and flash memory devices; magnetic disks, e.g., internal hard disks or removable disks; magneto optical disks; and CD ROM and DVD-ROM disks. The memory may store data, such as the contents of the database 248, the reports 280, or any data used in the various computing devices implemented in system 200. The memory may also store software related to the portal 240, the pricing engine 242, the hedge engine 244, the report engine 246, and any other software executed by any of the computing devices used in system 200.

In some embodiments, some or all of the foregoing data structures may be stored in one or more tables in a relational database described in terms of SQL statements or scripts. In some alternative or complimentary situations, some or all of the foregoing data structures may be formatted, stored, or defined as various data structures in text files, eXtensible Markup Language ("XML") documents, Virtual Storage Access Method ("VSAM") files, flat files, Btrieve files, comma-separated-value ("CSV") files, internal variables, or one or more libraries. In short, the foregoing data structures may comprise one table or file or a plurality of tables or files stored on one computer or across a plurality of computers in any appropriate format. Indeed, some or all of the foregoing data structures may be local or remote without departing from the scope of this disclosure and store any type of appropriate data.

Each computing device in system 200 may contain a processor that executes instructions and manipulates data to perform the operations of a computing device such as, for example, a central processing unit (CPU), a blade, an application specific integrated circuit (ASIC), or a field-programmable gate array (FPGA). Generally, the processor will be operatively coupled to receive data and/or instructions from, or transfer data to, the memory. The processor and some or all of the data stored in the memory can be supplemented by, or incorporated in, special purpose logic circuitry, such as an application-specific integrated circuit.

The SA 228, wholesaler 224, retailer 226, and customer usage database 210 may each comprise or reference a local, distributed, or hosted computing software. At a high level, computing software is any application, program, module, process, or other software that may access, retrieve, modify, delete, or otherwise manage some information of the in the memory. One example computing software may be a computer application for performing any suitable business process by implementing or executing a plurality of steps. Another example of computing software is an application that provides interconnectivity with one or more, engines or modules. GUIs, which allow users to input data and interact with the system 200, are another example of computing software.

More specifically, computing software may be a composite application, or an application built on other applications, that includes an object access layer (OAL) and a service layer. The example service layer is operable to provide services to the composite application. These layers may help composite application to orchestrate a business process in synchronization with other existing processes (e.g., native processes of enterprise base systems) and leverage existing investments in the IT platform. Further, composite application 112 may run on a heterogeneous IT platform.

Computing software may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. Computing software may also perform processing automatically, which may indicate that the appropriate processing is substantially performed by at least one component of system 200. It should be understood that this disclosure further contemplates any suitable administrator or other user interaction with computing software or other components of system 200 without departing from its original scope. Finally, it will be understood that system 200 may utilize or be coupled with various instances of computing software. For example, SA 228 may run a first computing software that is communicably coupled with a second computing software that is running on the retailer 226.

Portions of the computing software may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET. Further, one or more processes associated with computing software may be stored, referenced, or executed remotely. For example, a portion of computing software may be a web service that is remotely called, while another portion of computing software may be an interface object bundled for processing locally. Moreover, computing software may be a child or sub-module of another software module or enterprise application (not illustrated) without departing from the scope of this disclosure. Indeed, computing software may be a hosted solution that allows multiple parties in different portions of the process to perform the respective processing. For example, SA 228 may access computing software, once developed, on retailer 226 or even as a hosted application located over network 220 without departing from the scope of this disclosure.

Regardless of the particular implementation, "software" may include software, firmware, wired or programmed hardware, or any combination thereof as appropriate. Indeed, each of the foregoing software applications may be written or described in any appropriate computer language including C, C++, Java, Visual Basic, assembler, Perl, any suitable version of 4GL, as well as others. It will be understood that while these applications are shown as a single multi-tasked module that implements the various features and functionality through various objects, methods, or other processes, each may instead be a distributed application with multiple sub-modules. Further, one or more processes associated with these applications may be stored, referenced, or executed remotely. Moreover, each of these software applications may be a child or sub-module of another software module or enterprise application (not illustrated) without departing from the scope of this disclosure.

Portions of the SA 228, the wholesaler 224, the customer usage database 210, and the retailer 226 may be clients and/or servers in a client/server architecture. A client is any local or remote computing device operable to receive requests from the user via a user interface, such as a GUI, a CLI (Command Line Interface), or any of numerous other user interfaces. Thus, where reference is made to a particular interface, it should be understood that any other user interface may be substituted in its place. In various embodiments, each client includes at least user interface and comprises an electronic computing device operable to receive, transmit, process and store any appropriate data associated with system 200. It will be understood that there may be any number of clients communicably coupled to any given server. Further, "client" and "user" may be used interchangeably as appropriate without departing from the scope of this disclosure. Moreover, for ease of illustration, each client may be described in terms of being used by one user. But this disclosure contemplates that many users may use one computing device or that one user may use multiple computers to submit or review queries via user interface 116. As used in this disclosure, a client is intended to encompass a personal computer, touch screen terminal, workstation, network computer, kiosk, wireless data port, wireless or wireline phone, personal data assistant (PDA), one or more processors within these or other devices, or any other suitable processing device. For example, a client may comprise a computer that includes an input device, such as a keypad, touch screen, mouse, or other device that can accept information, and an output device that conveys information associated with the operation of a server or clients, including digital data, visual information, or user interface. Both the input device and output device may include fixed or removable storage media such as a magnetic computer disk, CD-ROM, or other suitable media to both receive input from and provide output to users of a client through the display, namely a user interface.

A GUI is a computer program hosted on a client. A GUI comprises a graphical user interface operable to allow the user of a client to interface with at least a portion of system 200 for any suitable purpose, such as viewing application or other transaction data. Generally, a GUI provides the particular user with an efficient and user-friendly presentation of data provided by or communicated within system 200, such as current pricing 254 or customer data 252. The GUI has presentation elements which may correspond to underlying data and/or to business objects of system 200. Business objects may be software data structures that correspond to business entities, such as customers, prices, usage, and others.

As shown in later figures, GUIs may comprise a plurality of customizable frames or views having interactive fields, pull-down lists, and buttons operated by a user. For example, a GUI may be operable to display certain presentation elements in a user-friendly form based on the user context, such as being tailored to a specific SA 228 that is logged into system 226, and the displayed data. It should be understood that the term graphical user interface may be used in the singular or in the plural to describe one or more graphical user interfaces and each of the displays of a particular graphical user interface. Indeed, reference to the GUI may indicate a reference to the front-end or a component of an application, as well as the particular interface accessible via a client, as appropriate, without departing from the scope of this disclosure. Therefore, a GUI contemplates any graphical user interface, such as a generic web browser or touchscreen, that processes information in system 200 and efficiently presents the results to the user. Servers can accept data from clients via a web browser (e.g., Microsoft Internet Explorer, Apple Safari, or Mozilla Firefox) and return the appropriate HTML or XML responses to the browser using network 220.

Figure 3A:
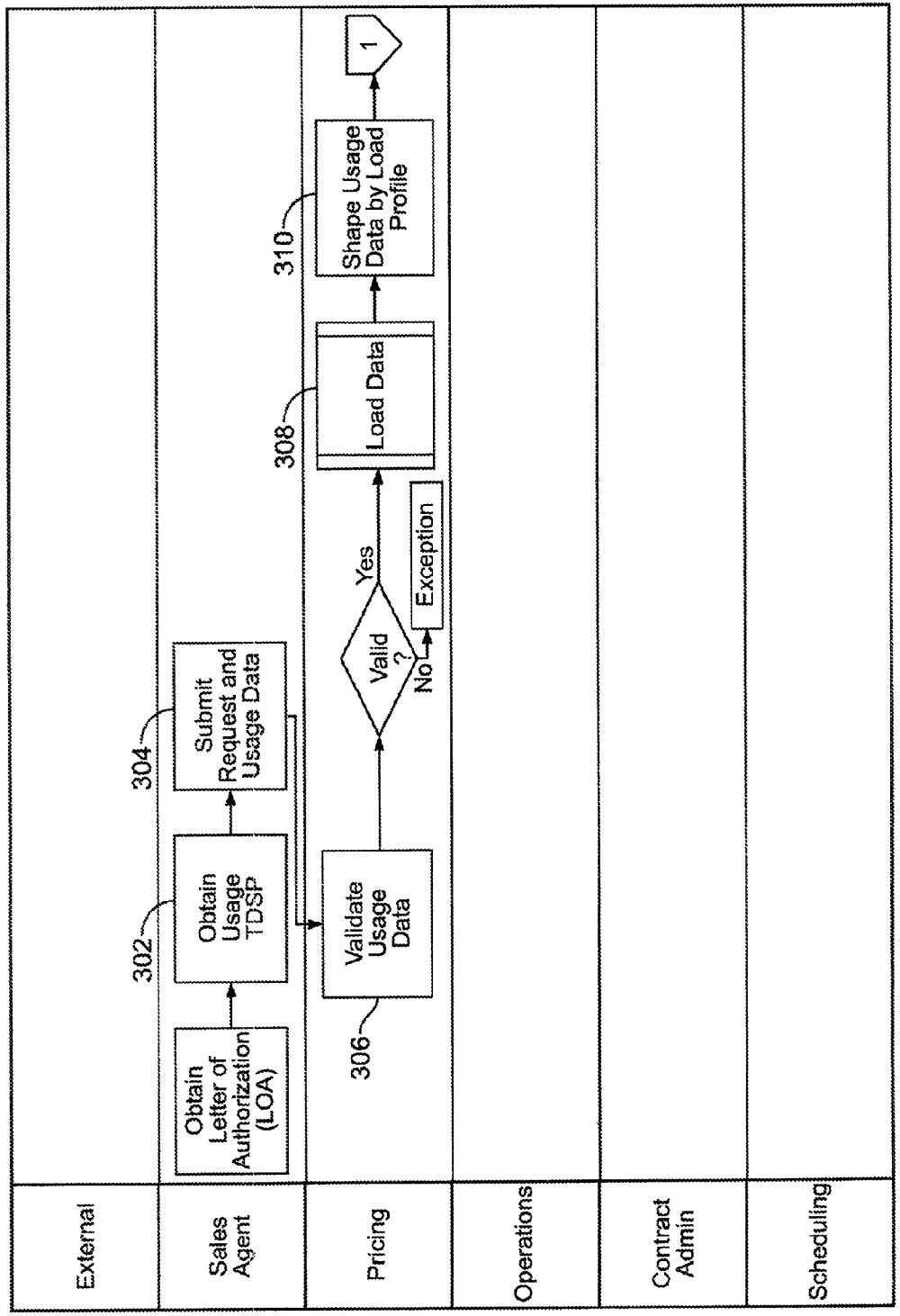
FIGS. 3A-3C depict a process flow diagram illustrating the operation of an example system for pricing energy for retail market and communicating pricing.
Figure 3B:
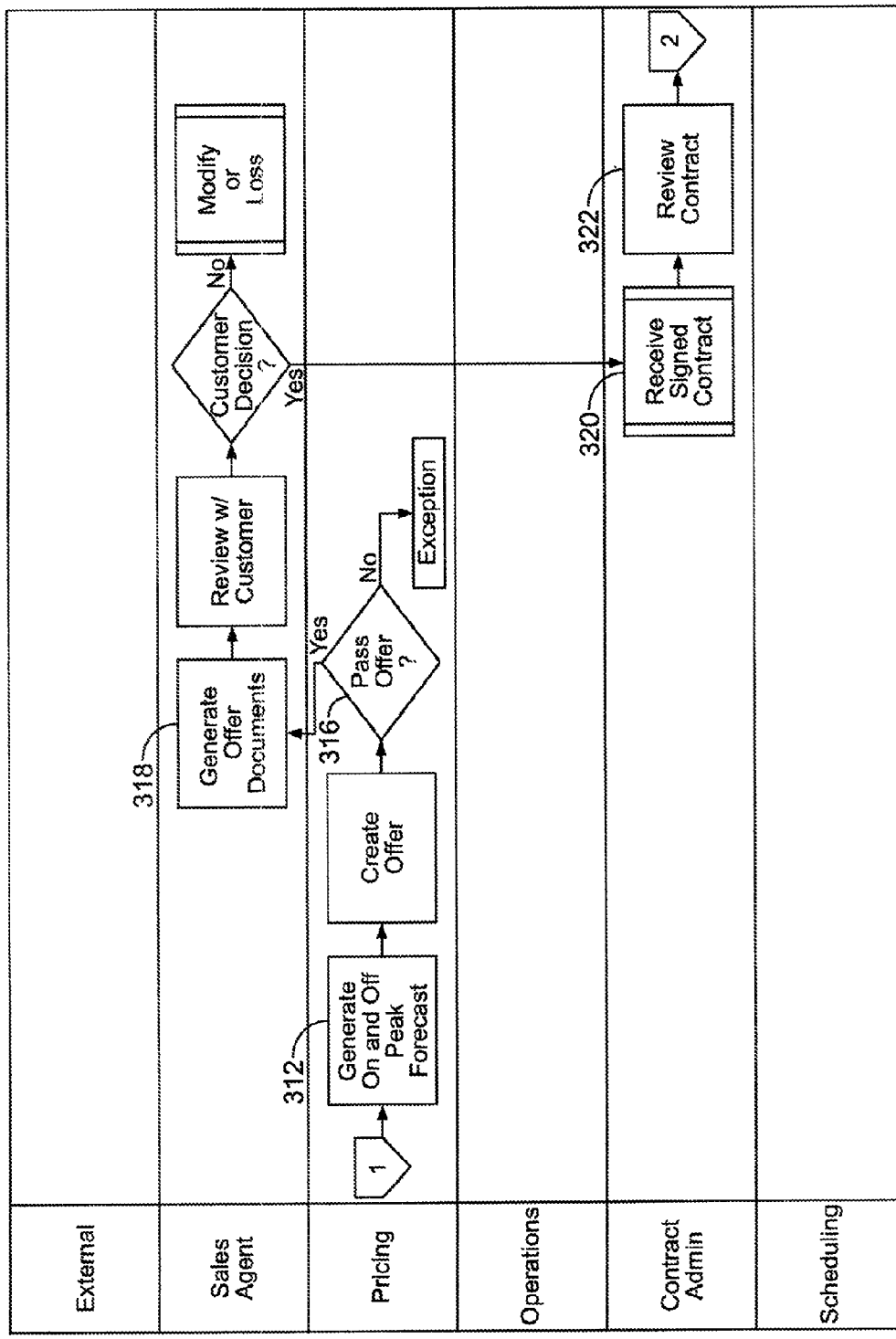
Figure 3C:
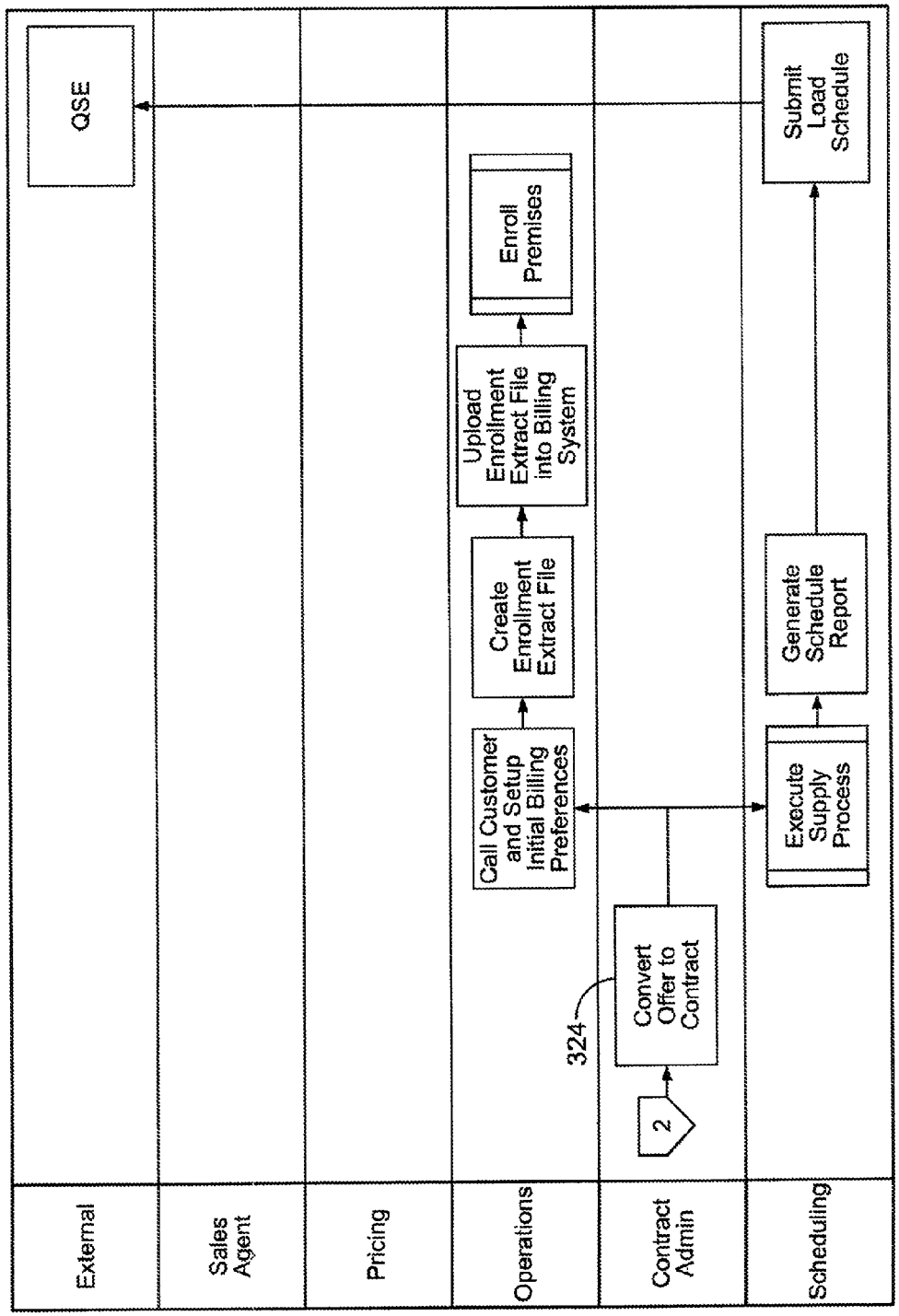

FIGS. 3A-3C depict a process flow diagram illustrating the operation of an example system for pricing energy for retail market and communicating pricing. At process block 302, the sales agent may obtain usage data associated with a customer. At process block 304, this data may be submitted to the retailer 226 along with a request for current pricing information. At block 306, the retailer 226 may validate the usage data. In some embodiments, the usage data may be obtained directly from a PCG and may not need verification. At block 308, the usage data is loaded into the retailer system 226. At block 310, the retailer system 226 may shape the usage data to the load profile to determine a more accurate indication of how the customer's usage is distributed. At block 312, the usage forecast may be generated. The usage forecast may be generated for a maximum number of months or for a number of months indicated by the customer or sales agent. At block 314, an offer may be created by determining a transactable price at which to sell the energy that is based on the customer's usage. In some embodiments, at block 316 the offer is validated. This may be done manually in some embodiments. At block 318, offer documents are generated. The documents may be generated on the retailer system 226 and transmitted to the sales agent, or may be generated at the sales agent based on information from the retailer system 226. A customer may decide to accept the offer and sign the documents. At block 320, the signed documents may be received and reviewed at block 322. At block 324, the signed offer documents may be converted to a contract.

Figure 4A:
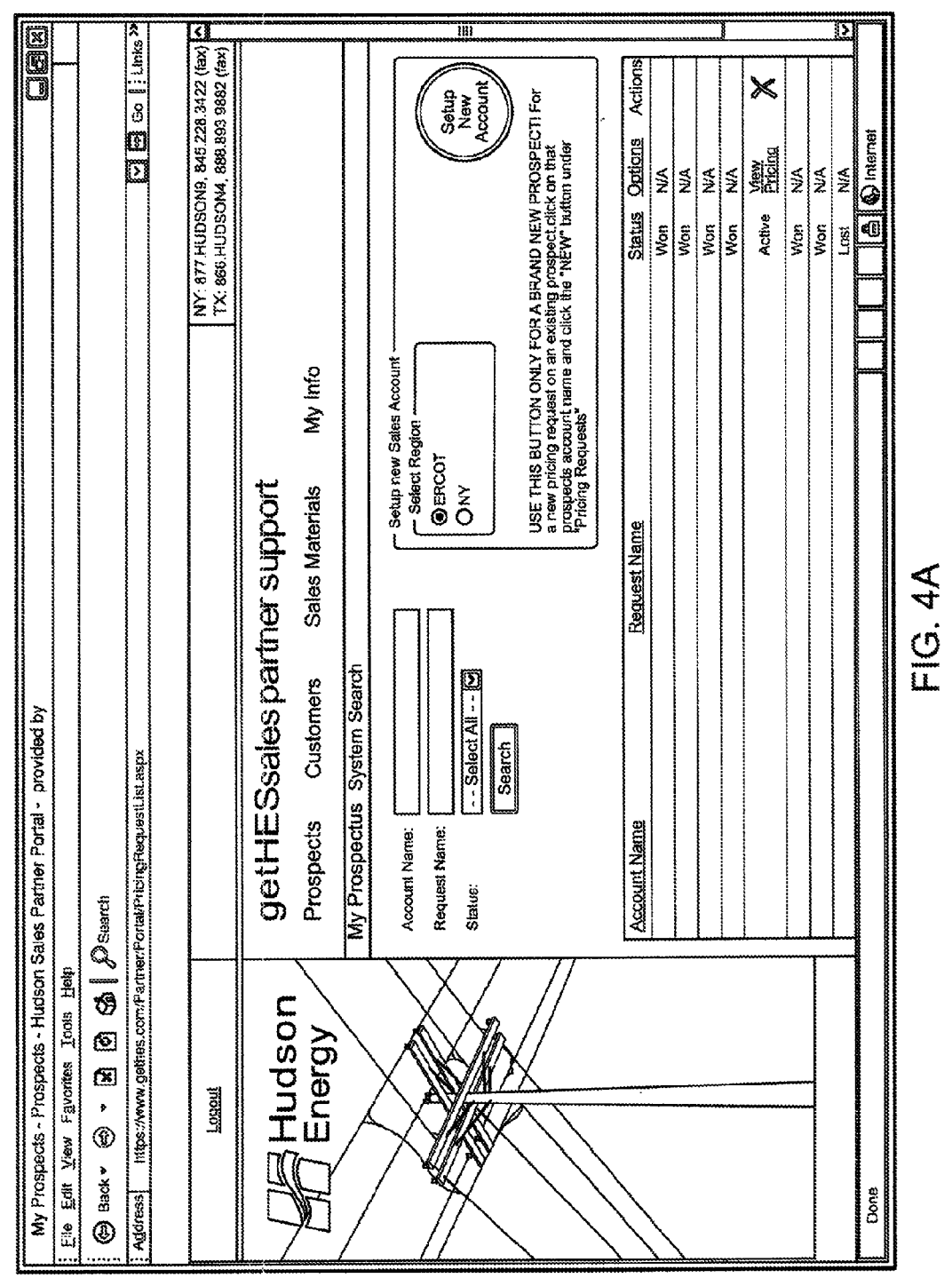
Figure 4B:
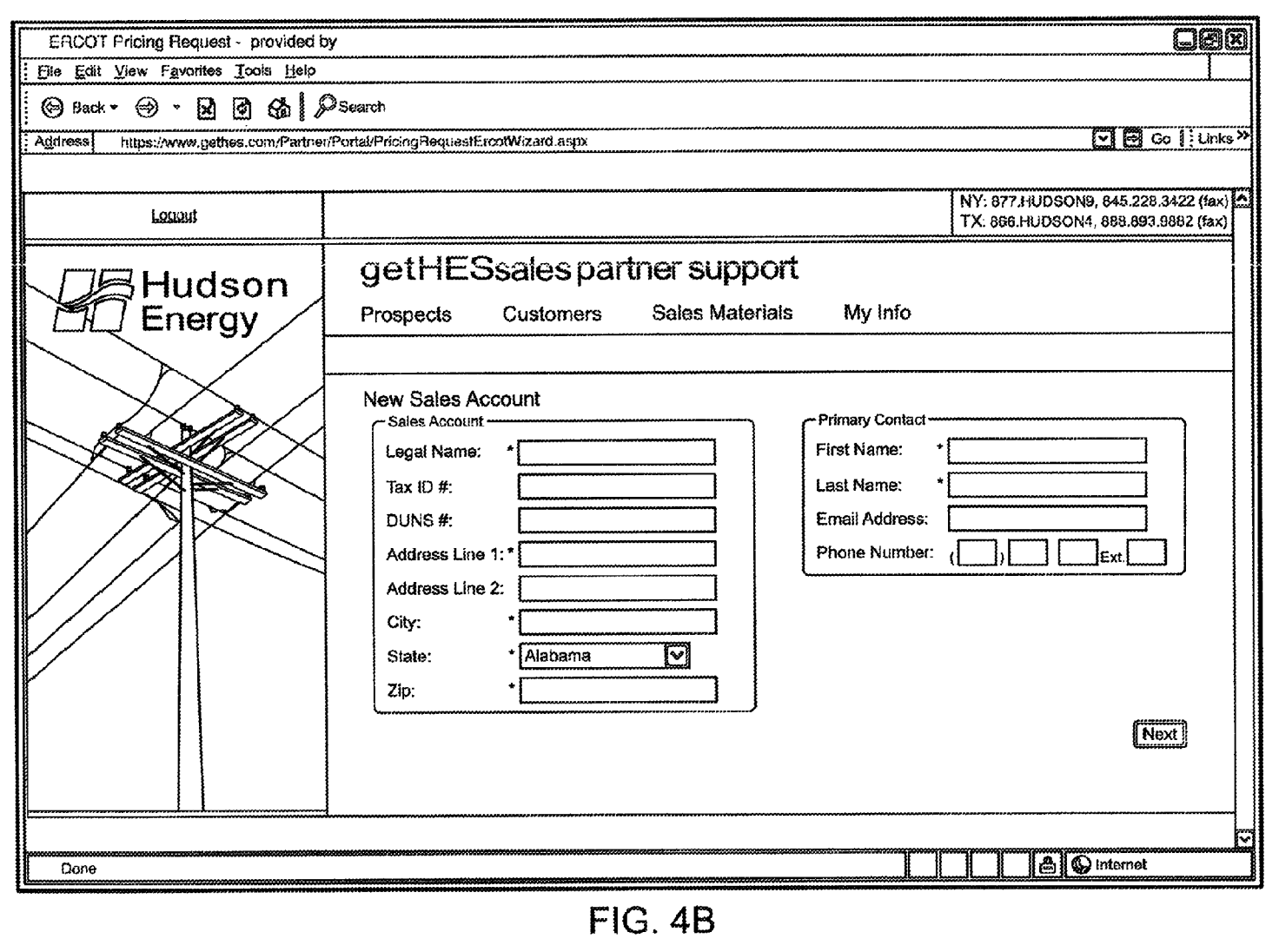
Figure 4C:
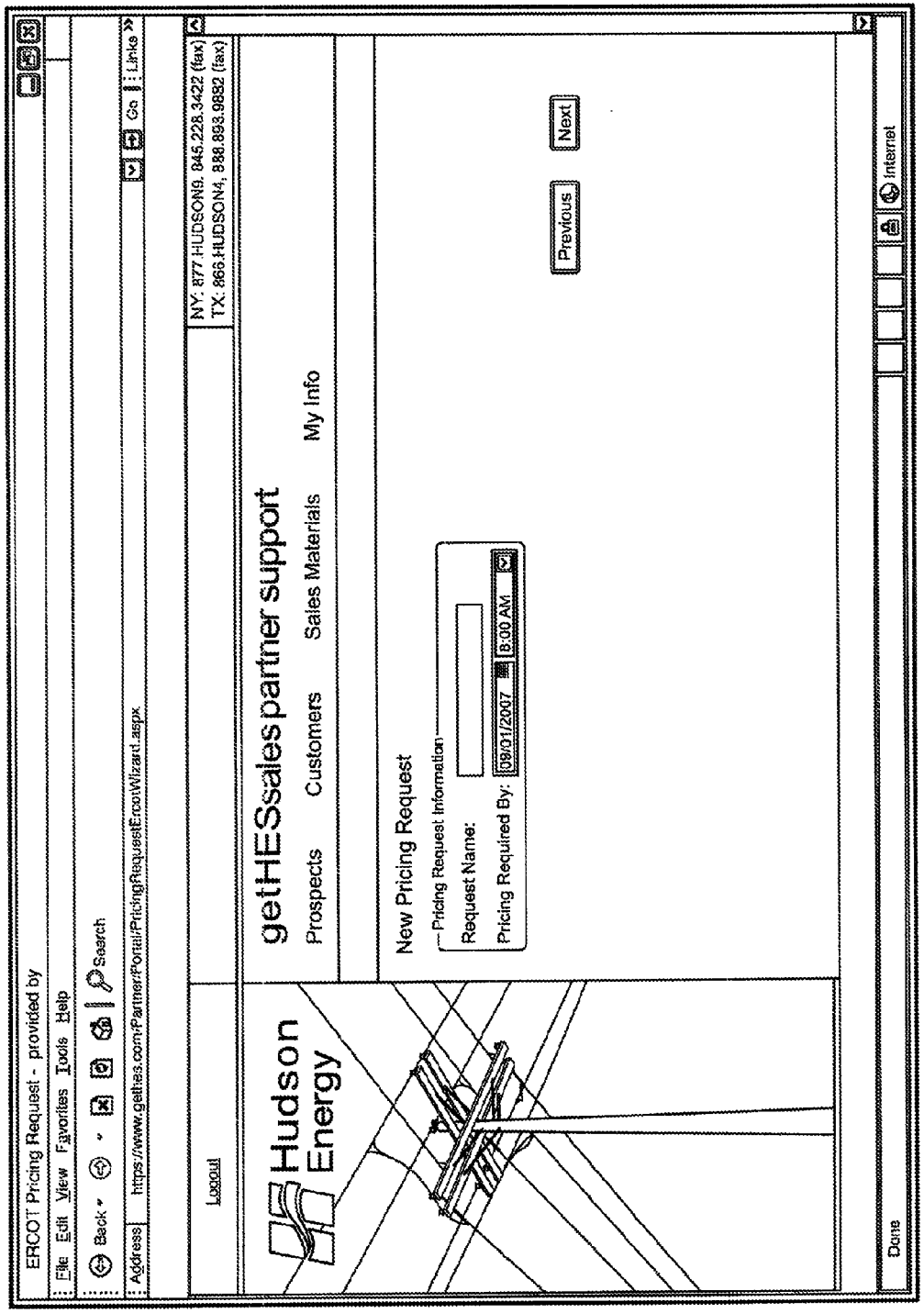
FIGS. 4A-4T are screen shots of graphical user interfaces (GUIs) associated with various aspects of the portal 240 of retailer system 226.
Figure 4D:
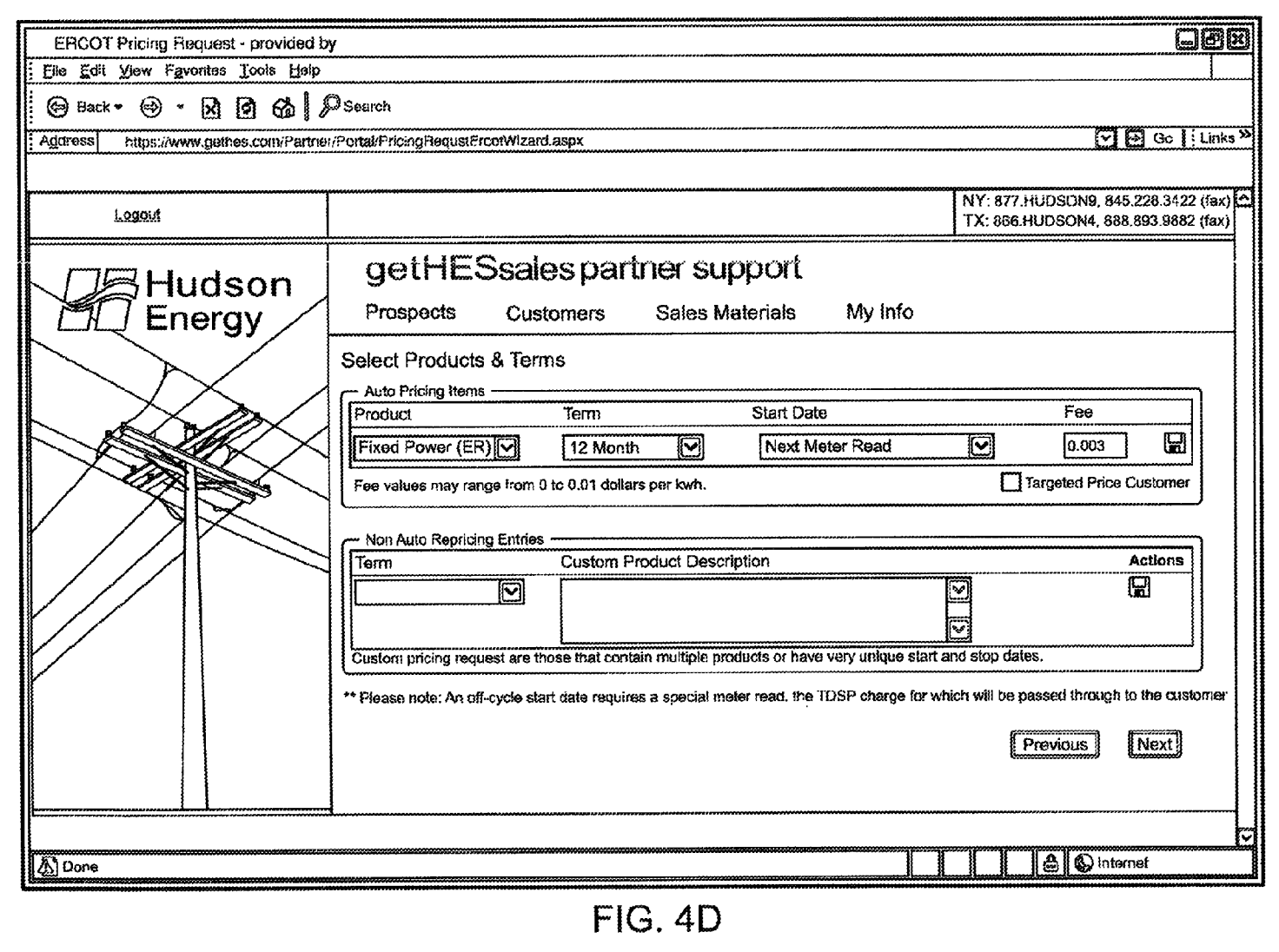
Figure 4E:
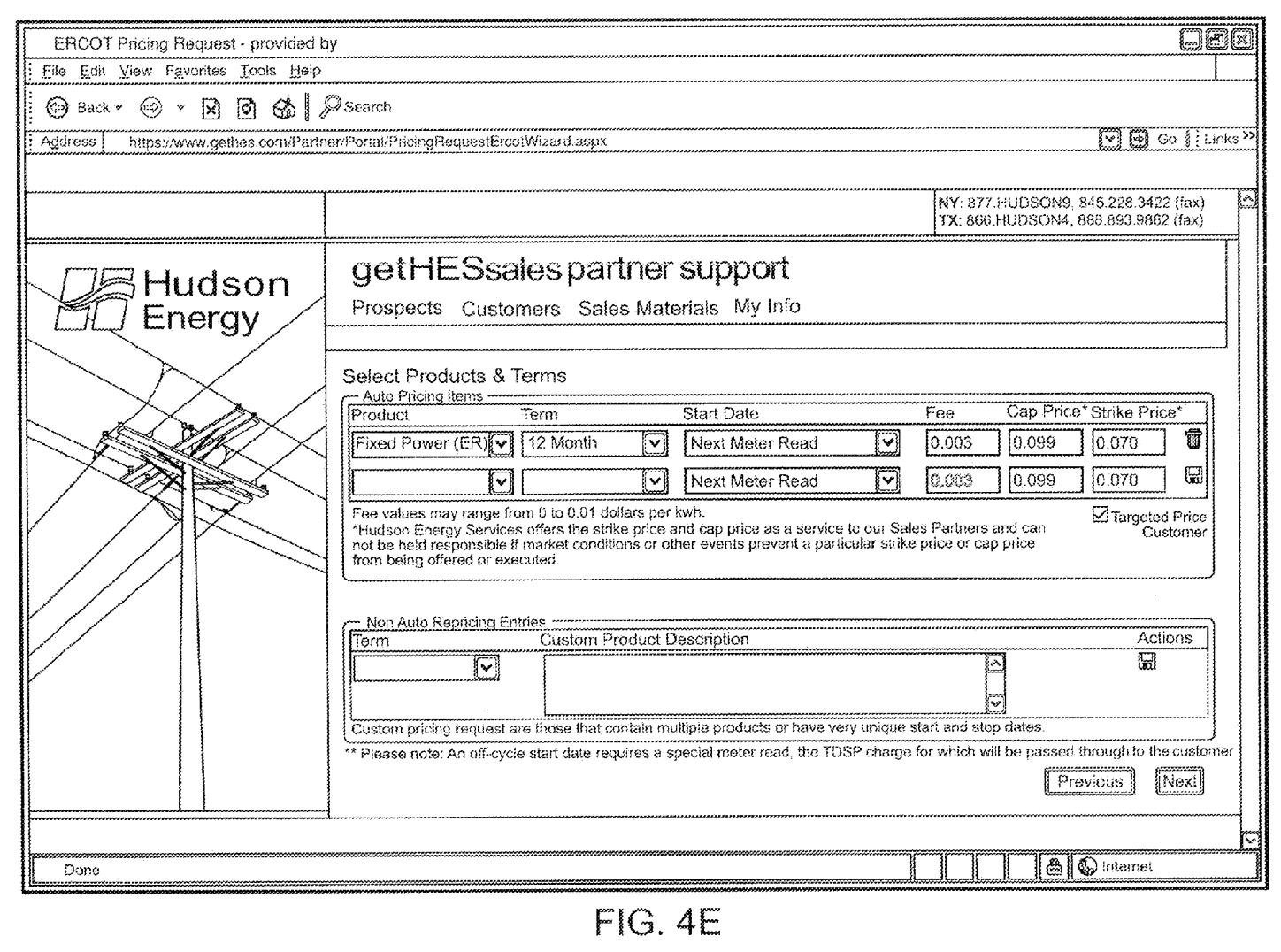
Figure 4F:
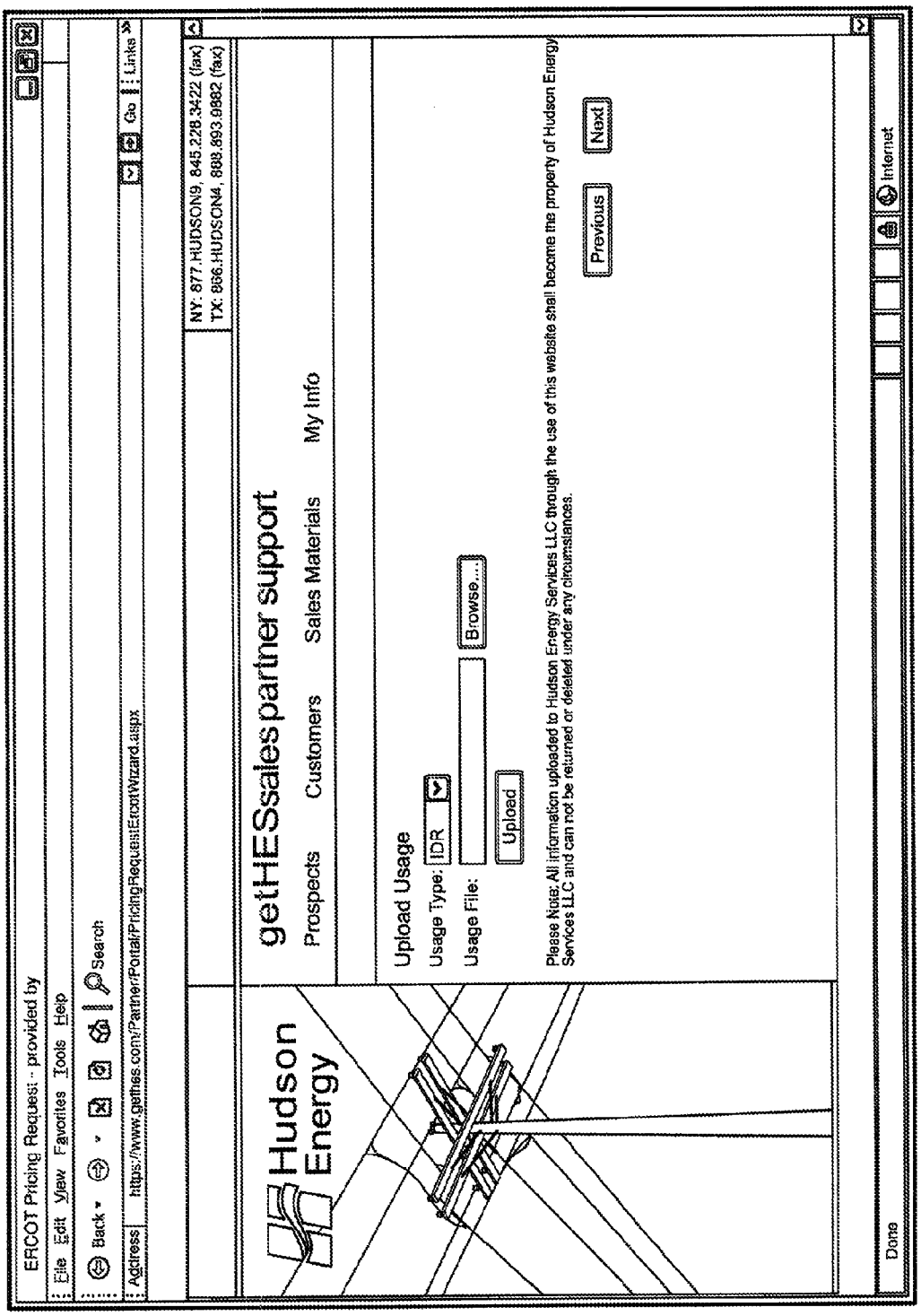
Figure 4G:
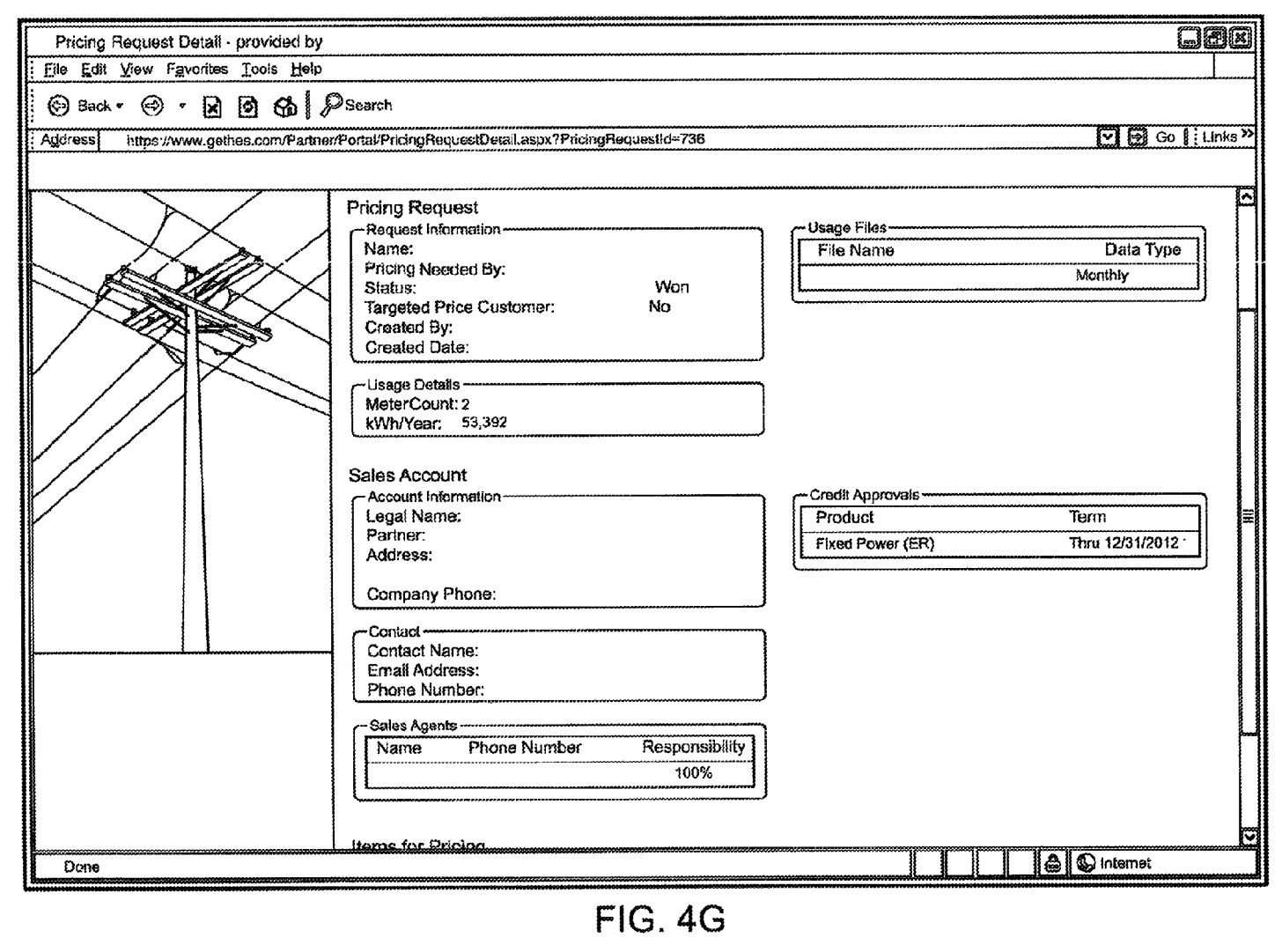
Figure 4J:
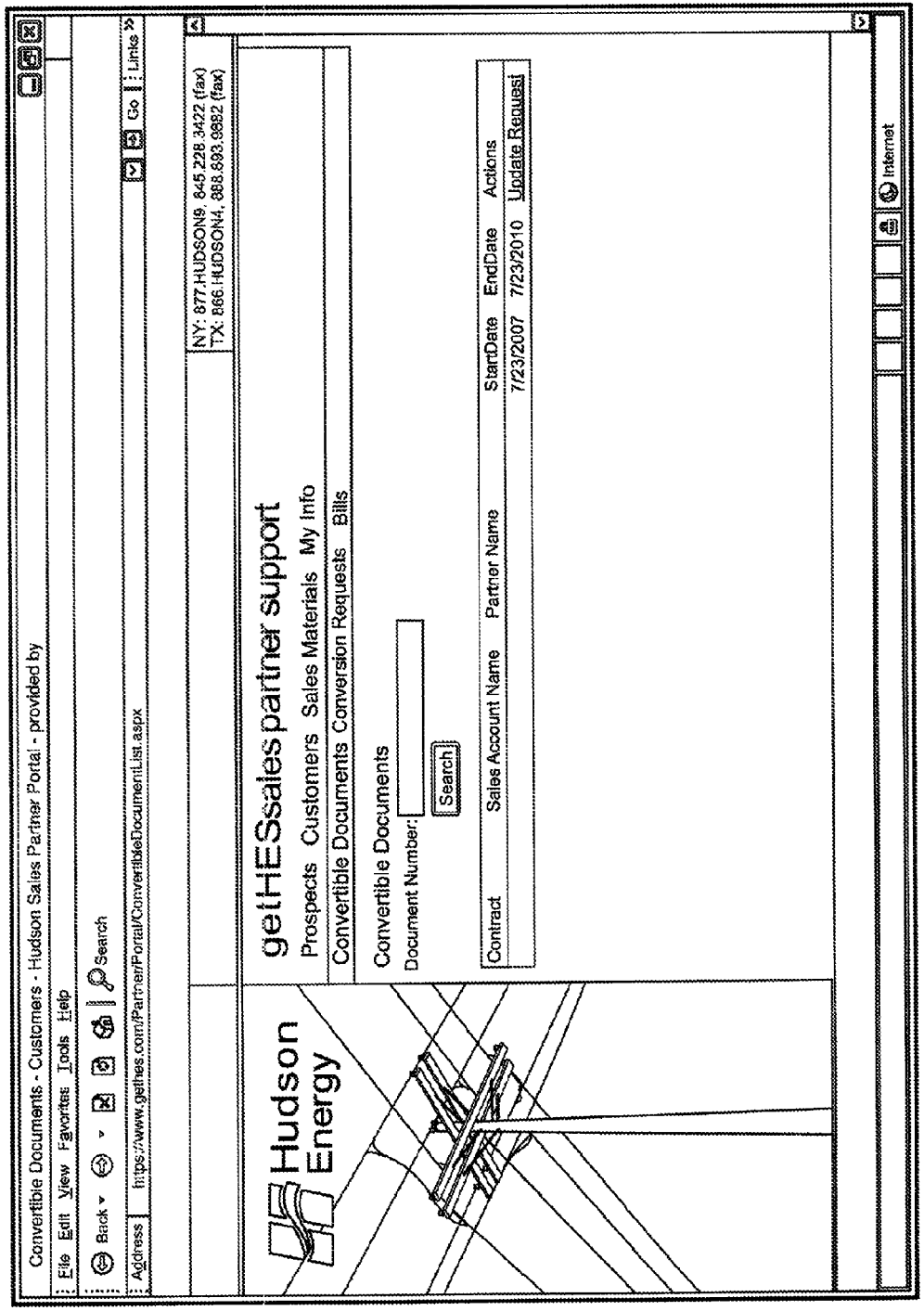
Figure 4K:
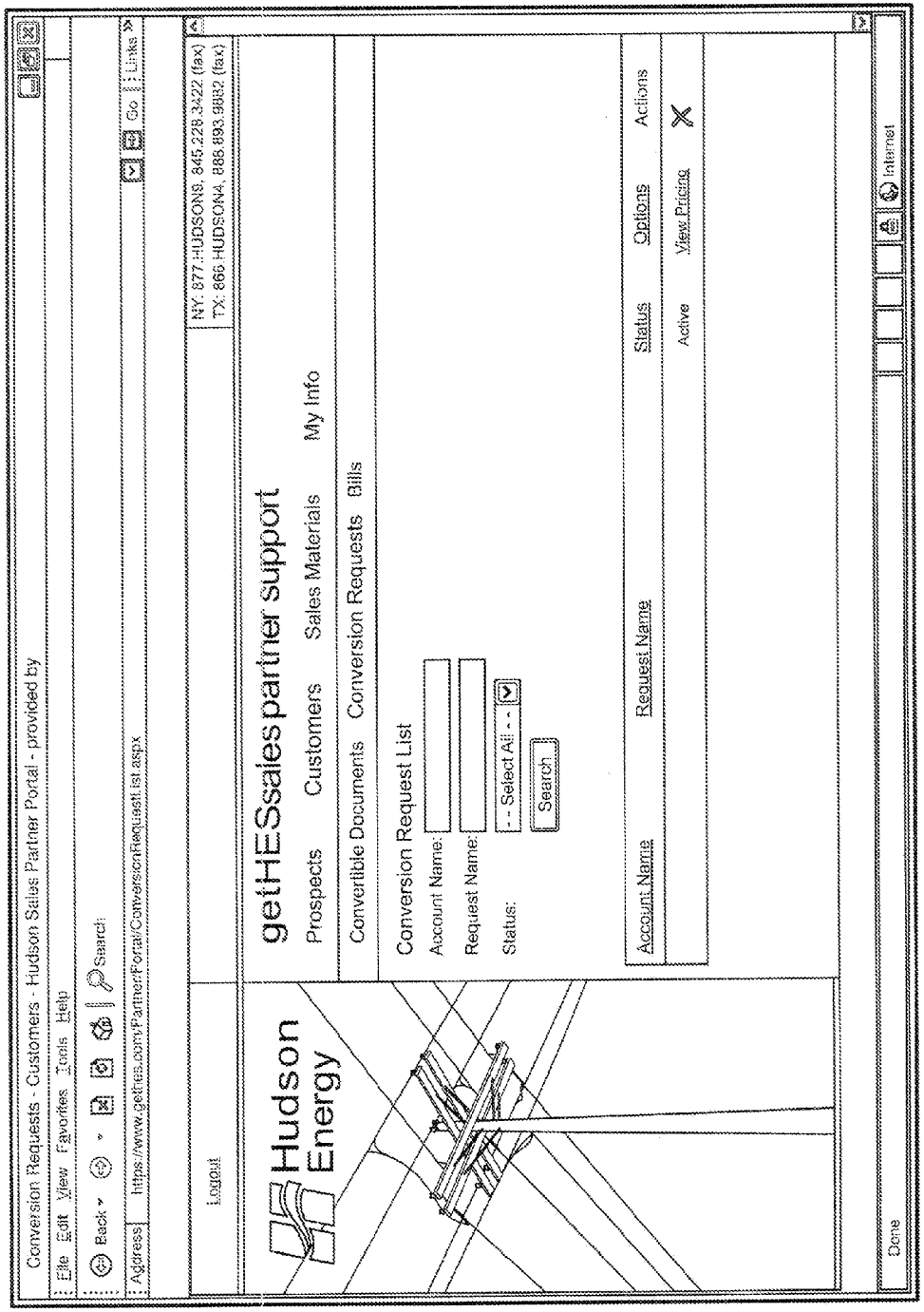
Figure 4L:
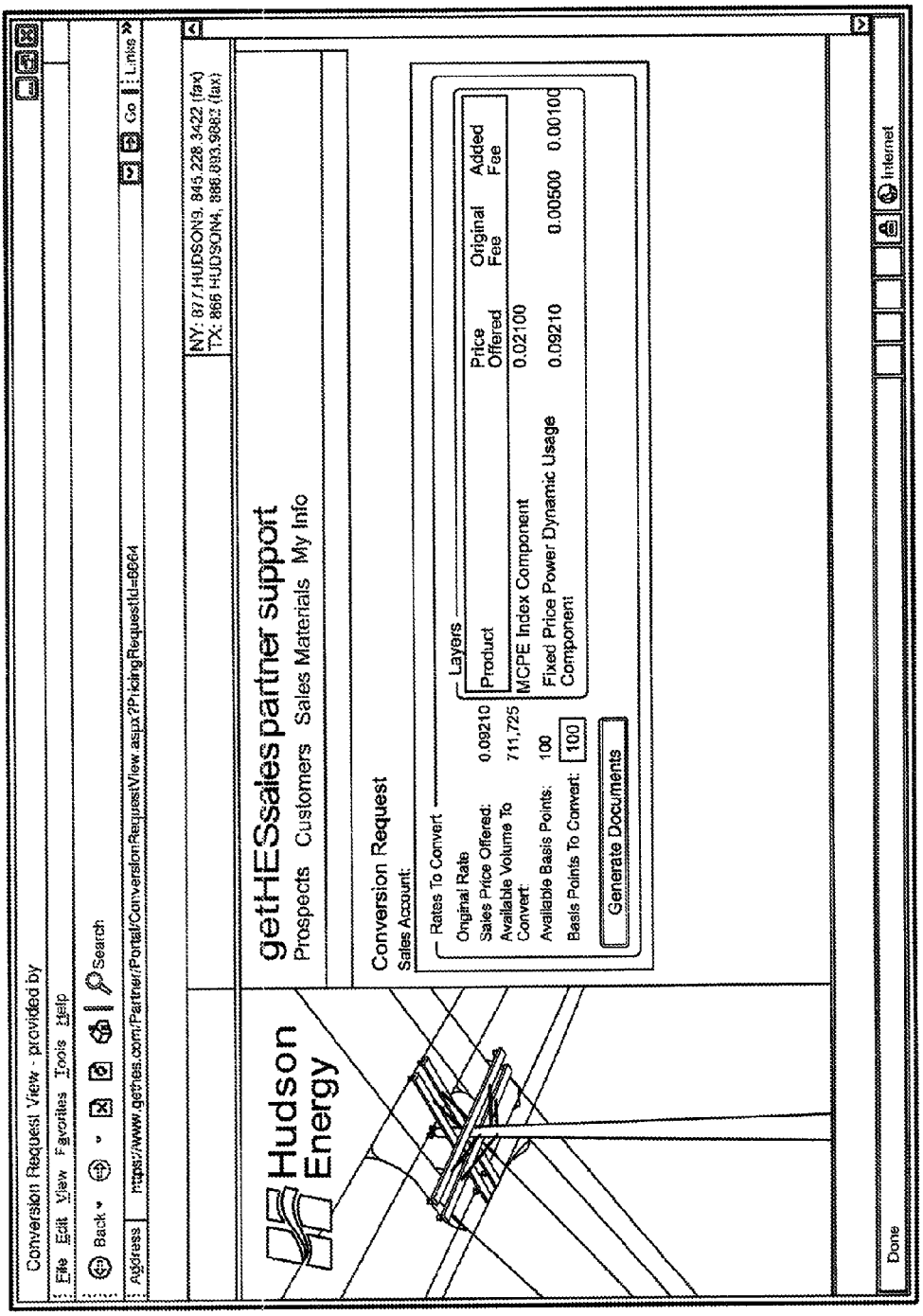
Figure 4M:
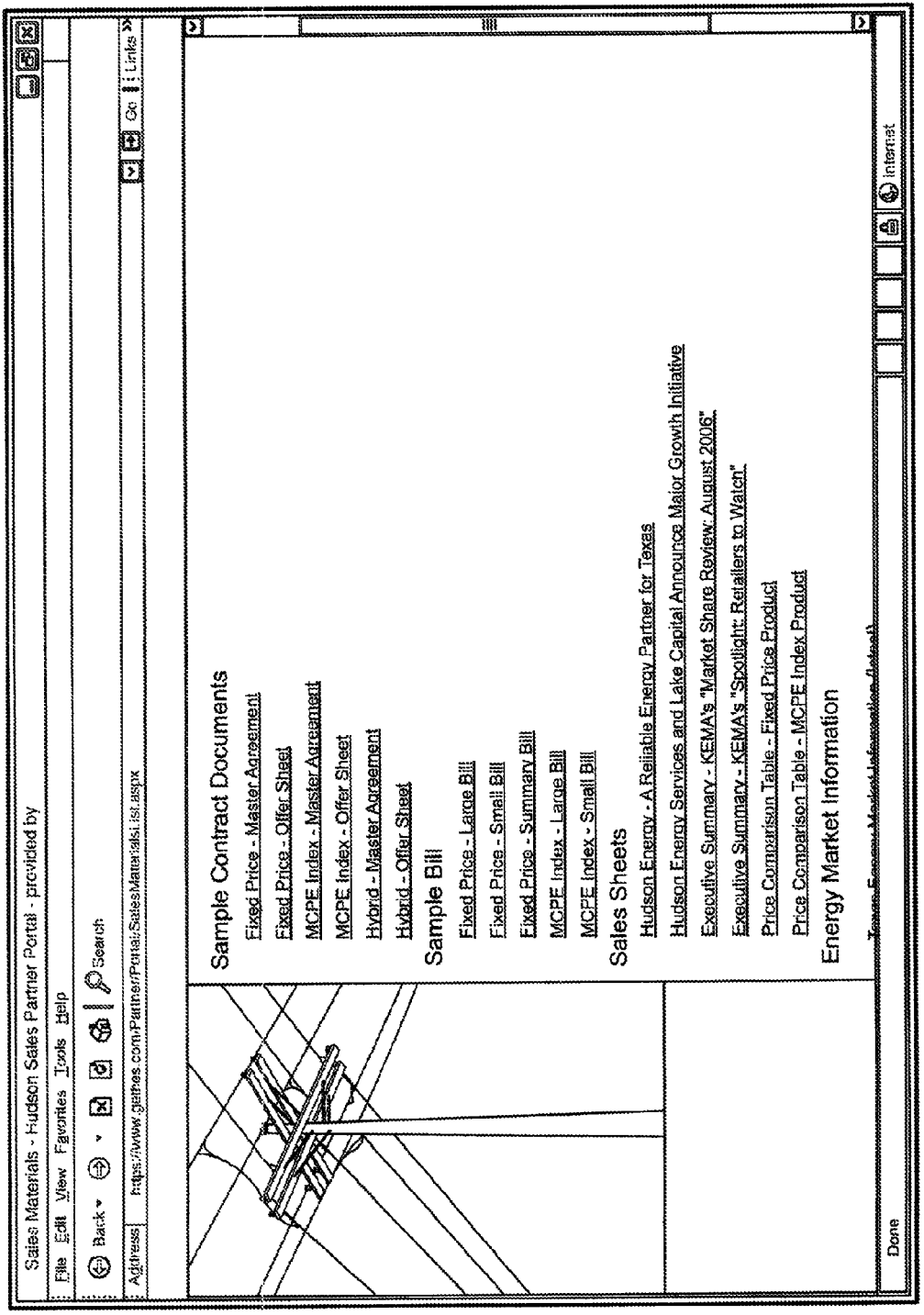
Figure 4N:
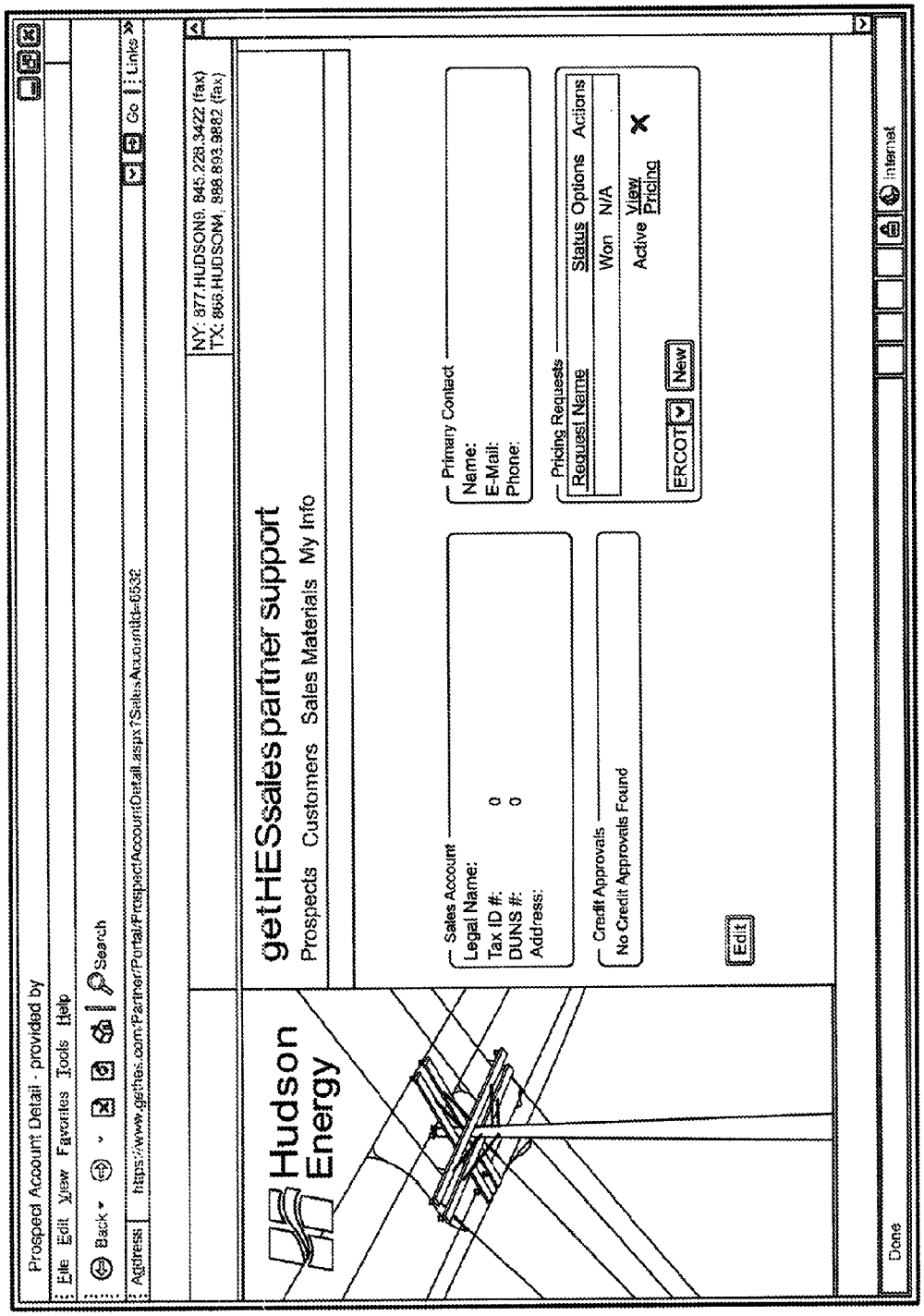
Figure 4P:
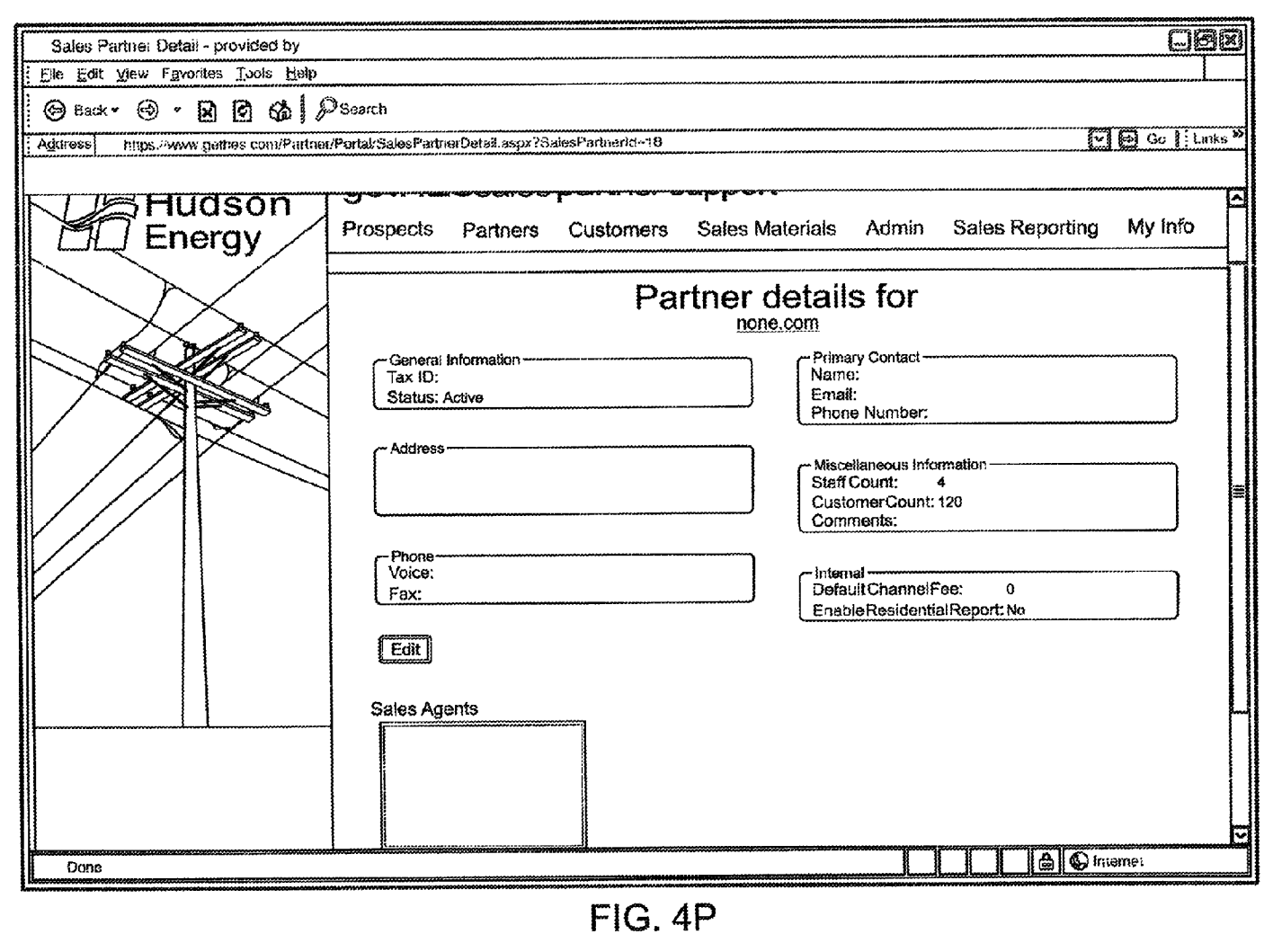
Figure 4Q:
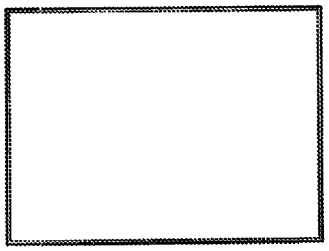
Figure 4R:
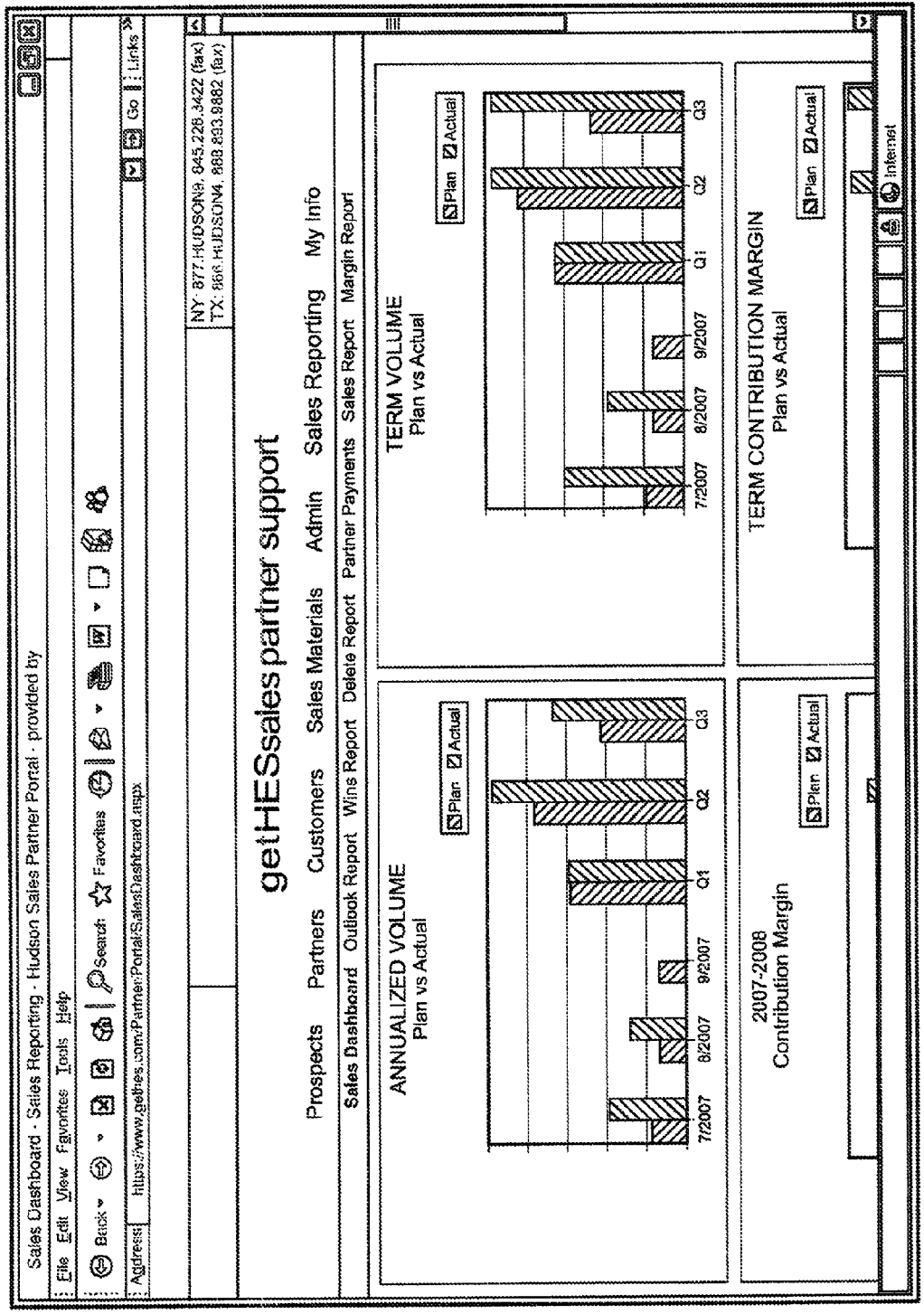
Figure 4T:
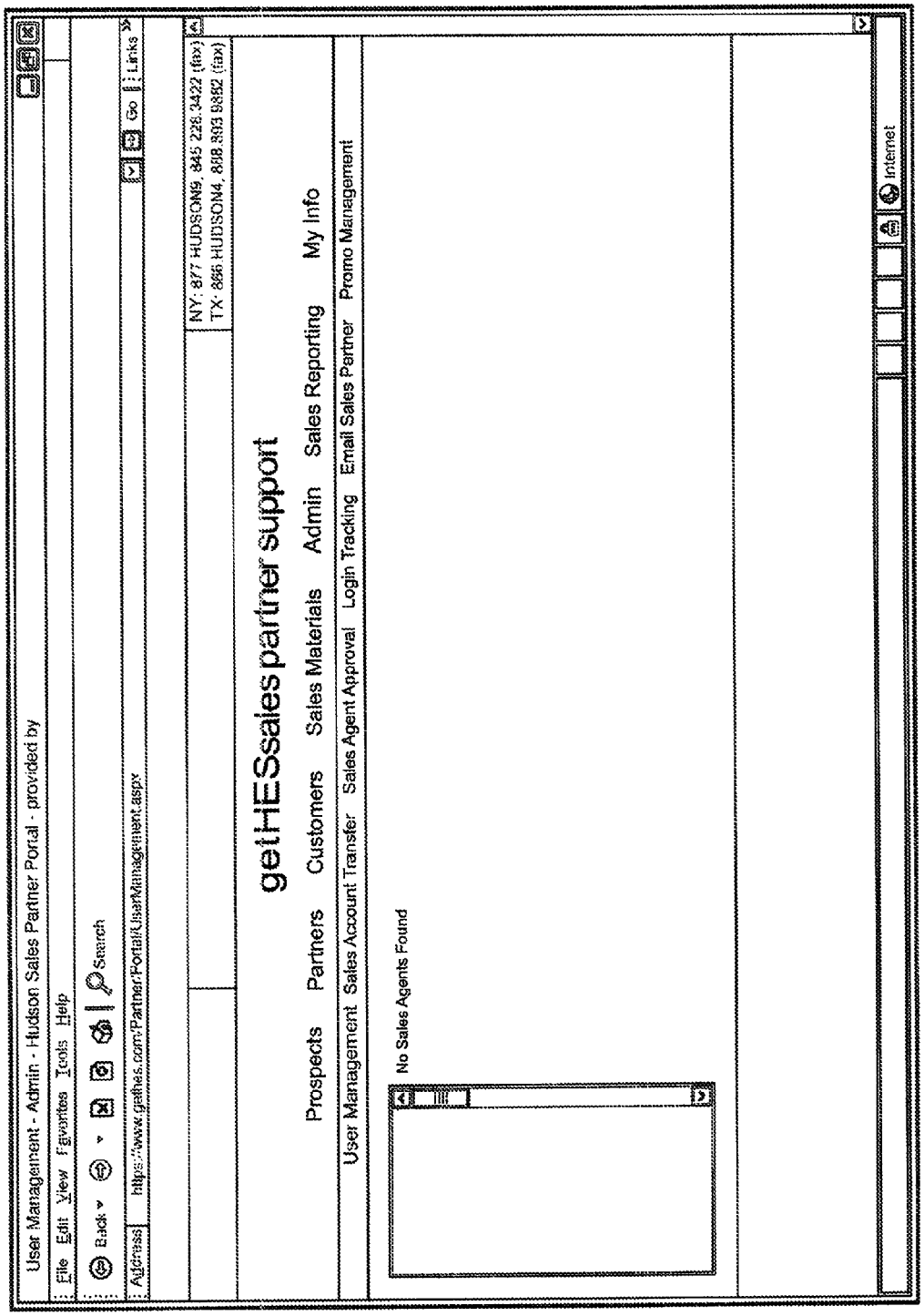

FIGS. 4A-4T are screen shots associated with various aspects of the portal 240 of retailer system 226. FIG. 4A is an example prospect list of potential customers 208. FIGS. 4B-4G are example screen shots associated with various aspects of setting up a customer with the retailer system 226. FIGS. 4H and 4I are example screen shots of transactable pricings based on a customer's usage. FIG. 4J is an example screen shot of a list of contracts that may be converted from one pricing model to another. FIG. 4K is an example screen shot of a conversion pricing request list. FIG. 4L is an example screen shot of pricing for a conversion request. FIG. 4M is a screen shot of a list of available sales material. FIG. 4N is a screen shot of an account view. FIG. 4O is a screen shot of a list of sales partners, which may not be available to SAs 228 that are not employees of the retailer 114. FIGS. 4P and 4Q are screen shots of a view of details of a third party sales partner. FIGS. 4R and 4S are screen shots of example sales reports. FIG. 4T is an example general administration page.

Figure 5A:
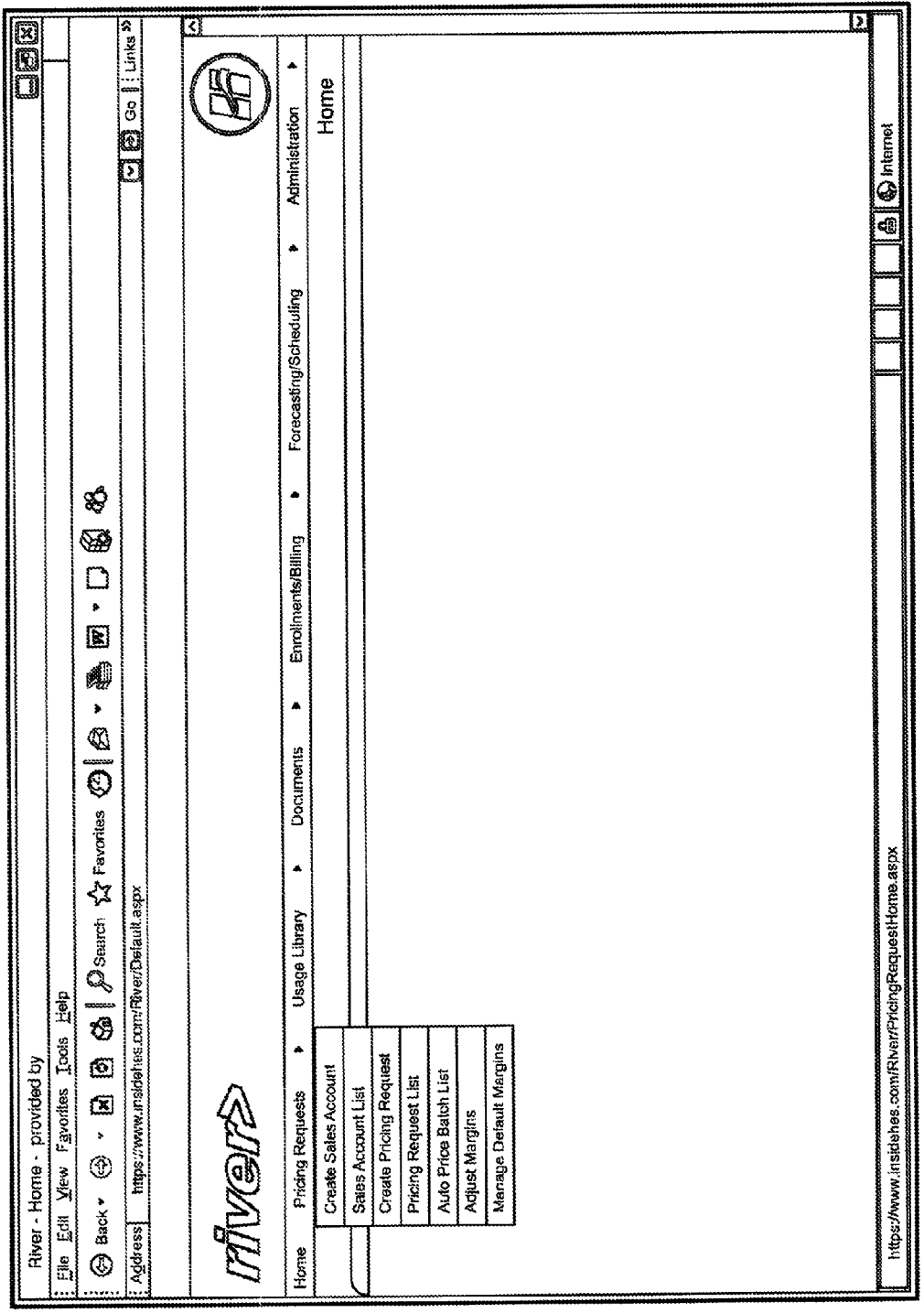
FIGS. 5A-5U are screen shots associated with various aspects of the pricing engine 242, hedge engine 244, report engine 246, and database 248.
Figure 5B:
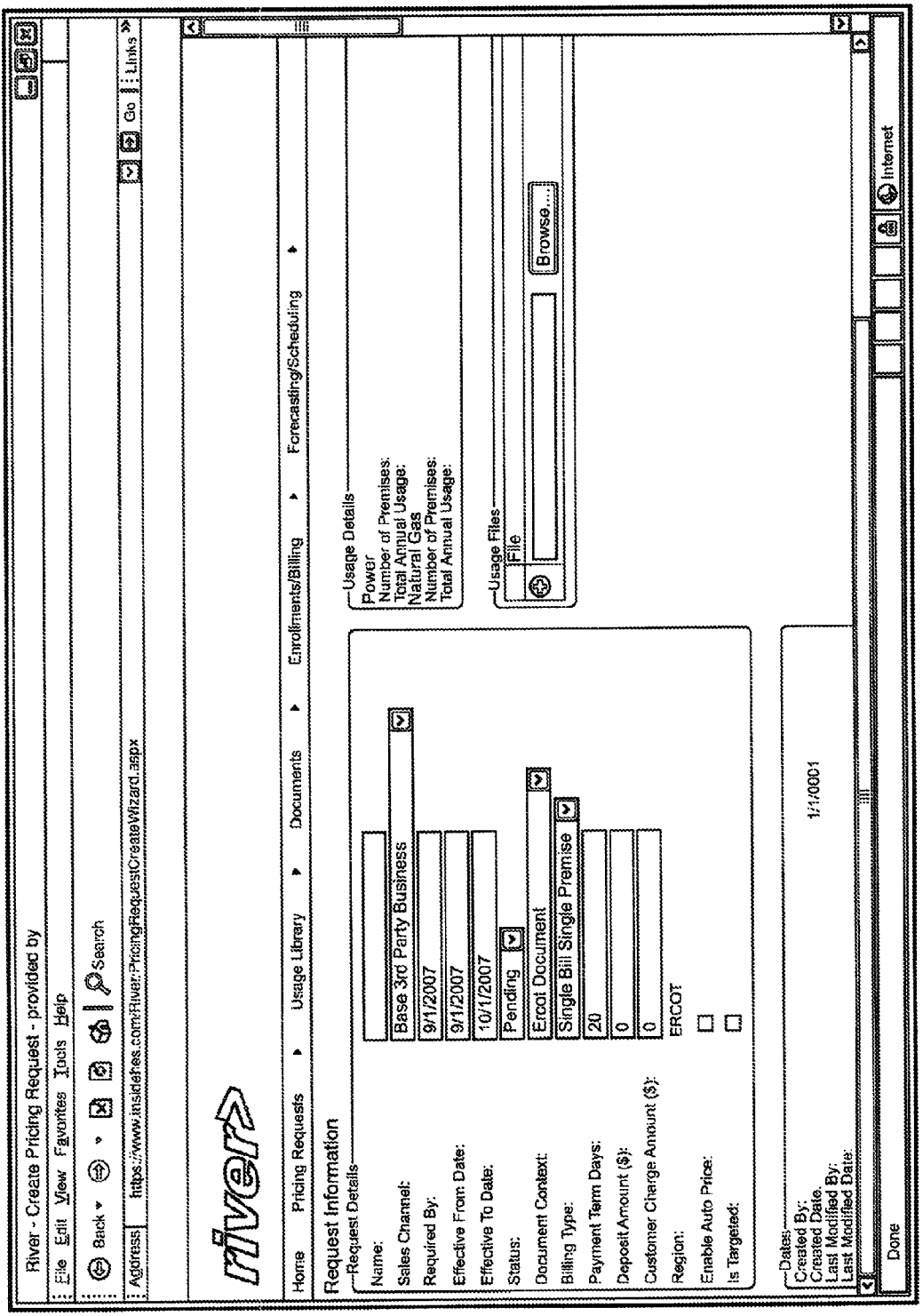
Figure 5C:
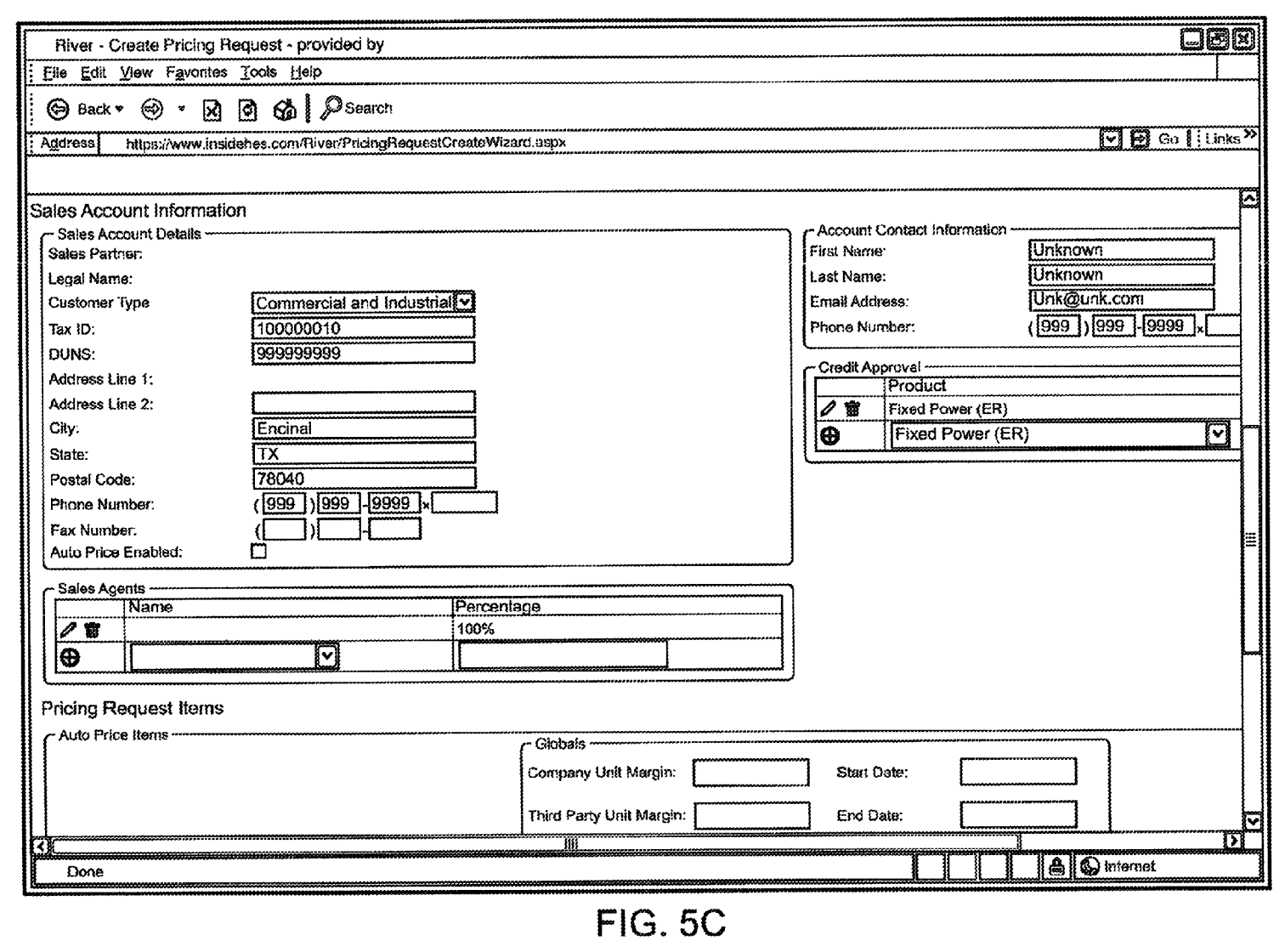
Figure 5D:
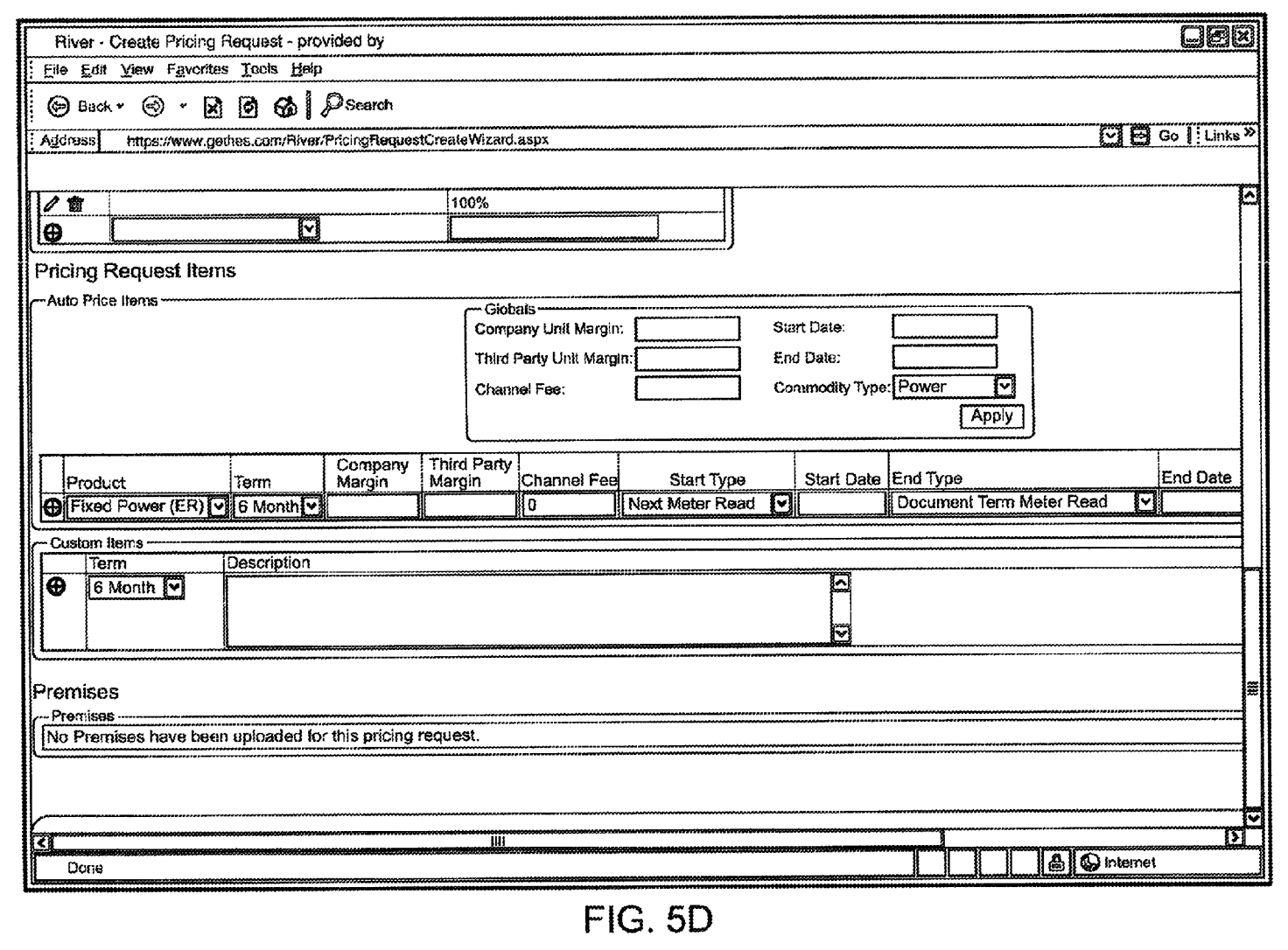
Figure 5E:
Figure 5G:
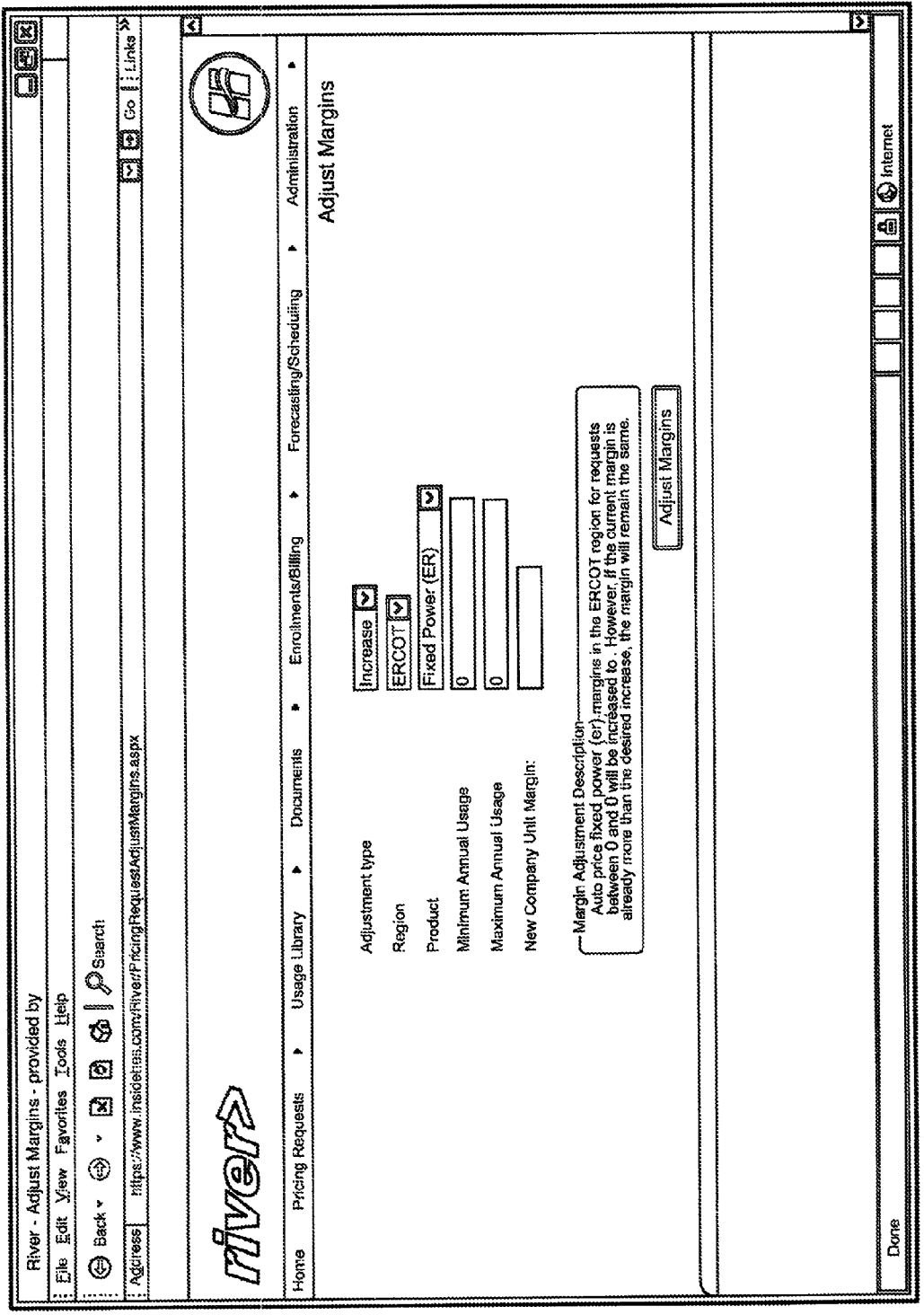
Figure 51:
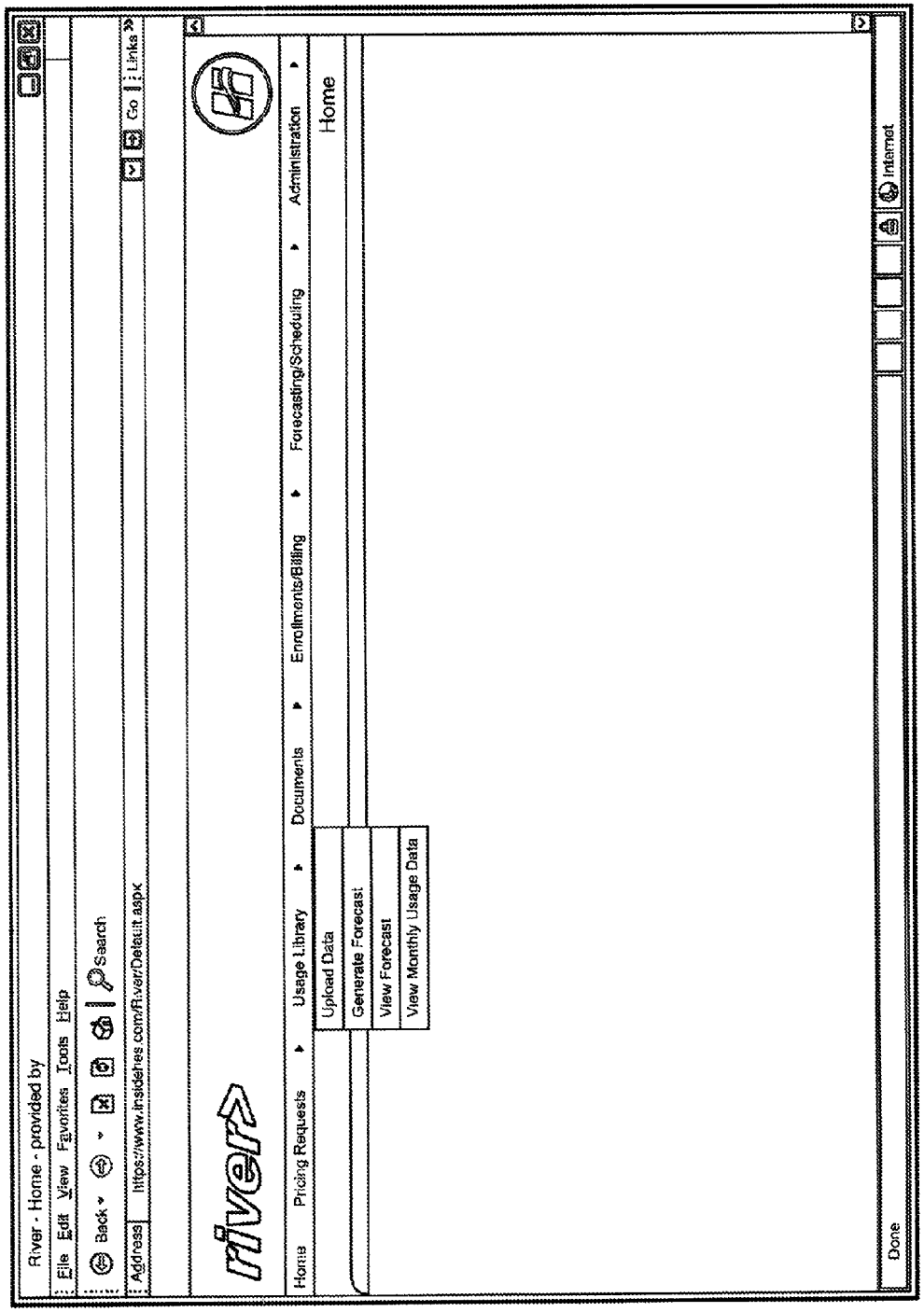
Figure 5K:
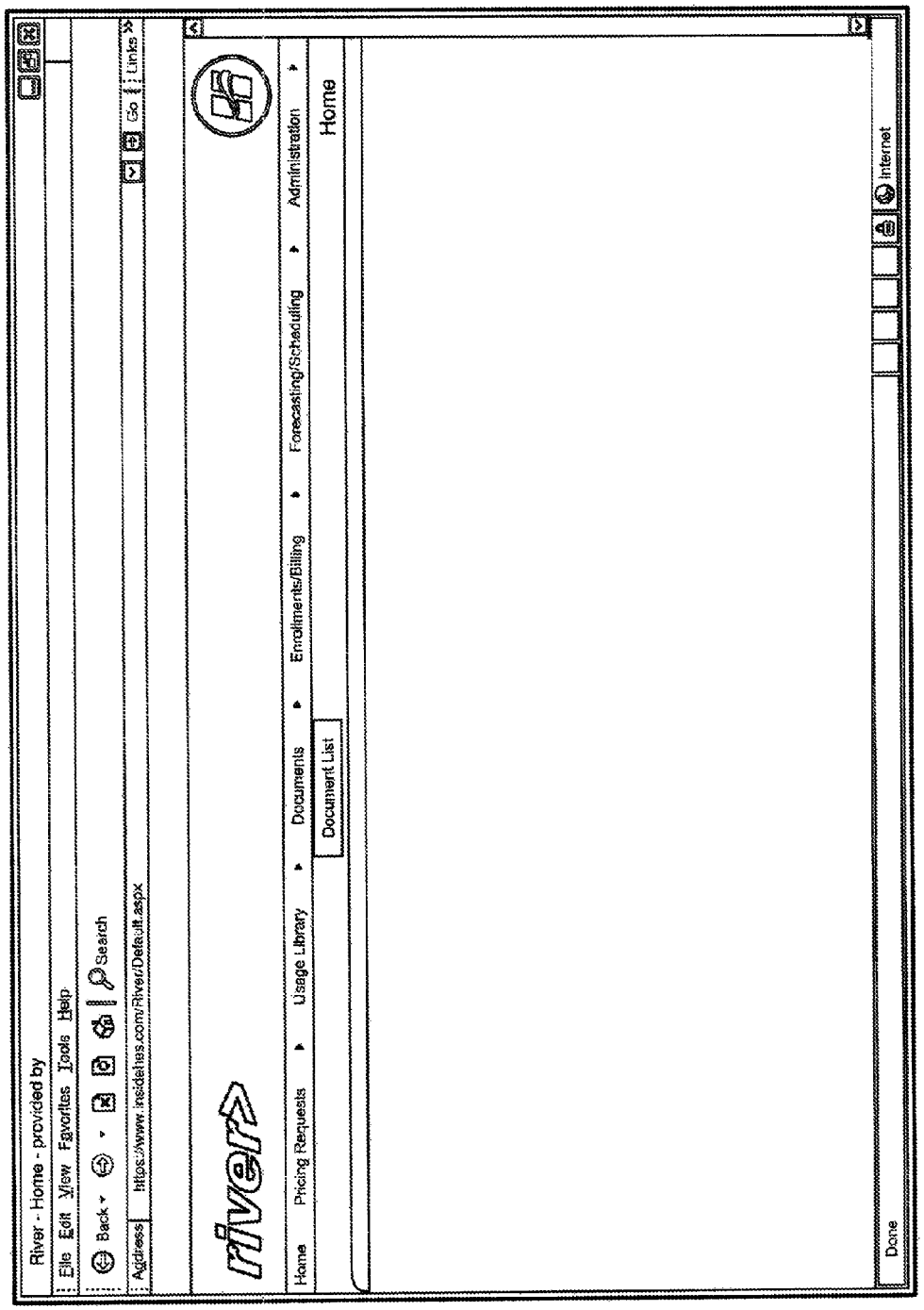
Figure 5L:
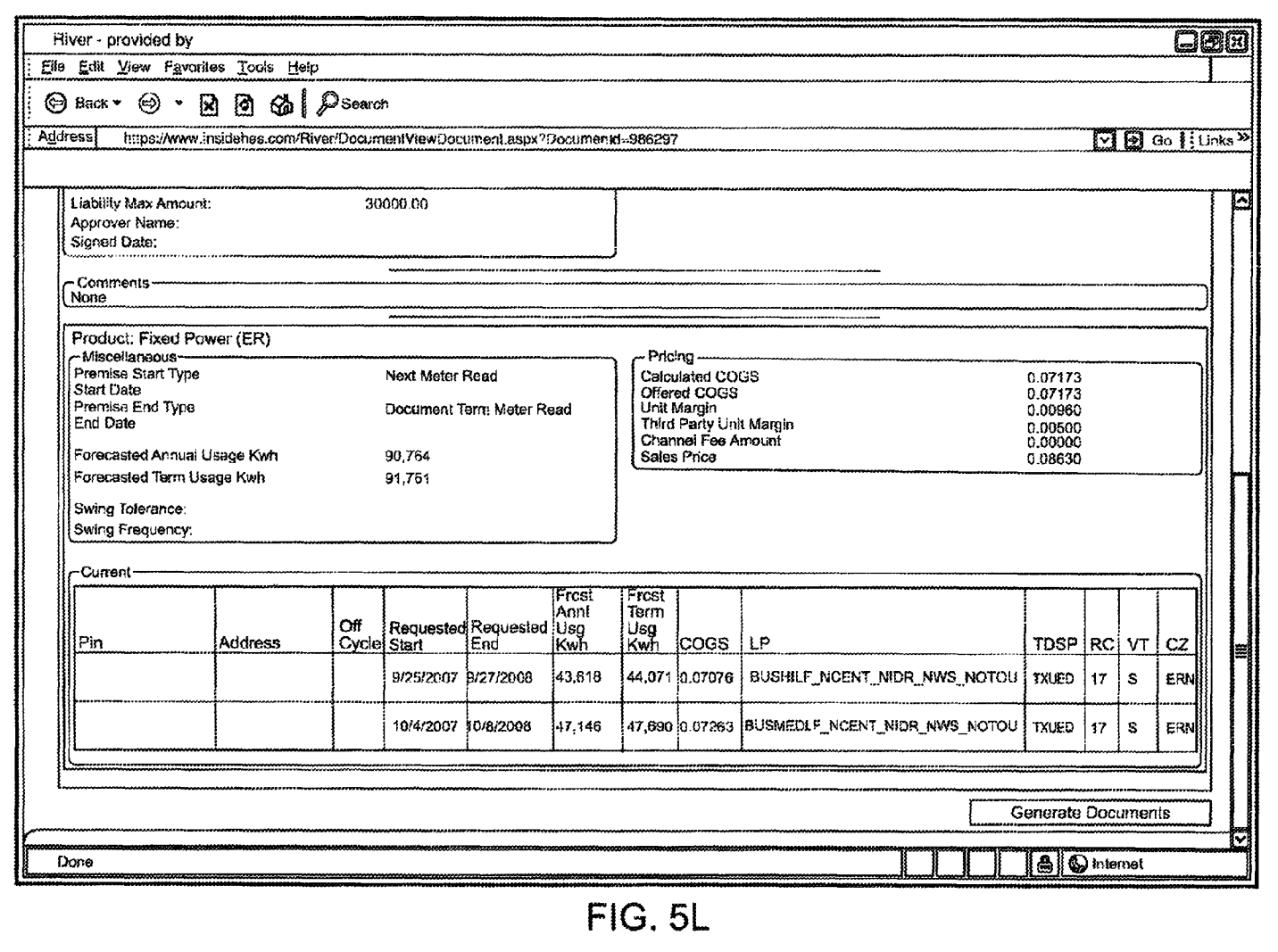
Figure 5M:
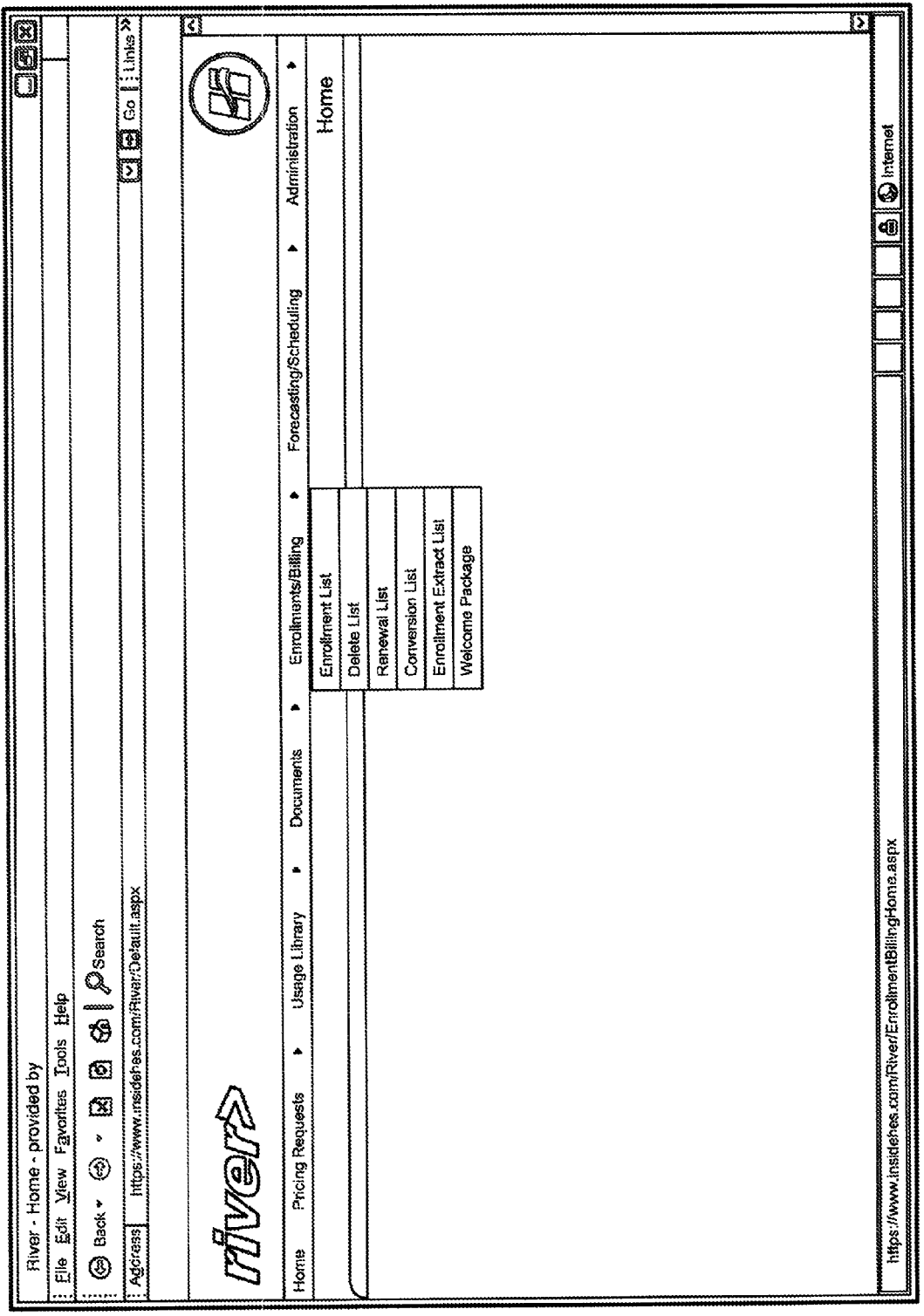
Figure 5P:
Figure 5R:
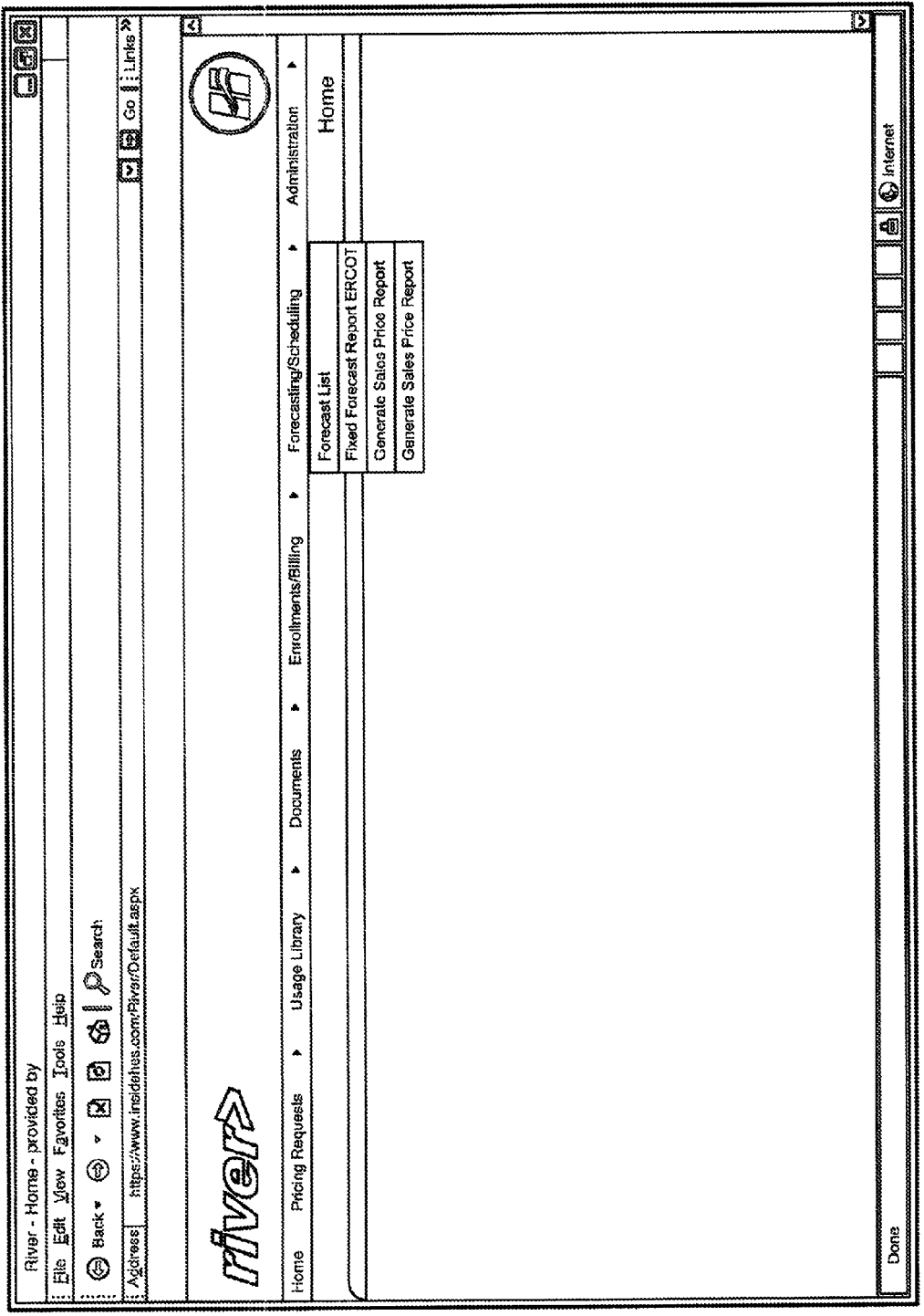
Figure 5S:
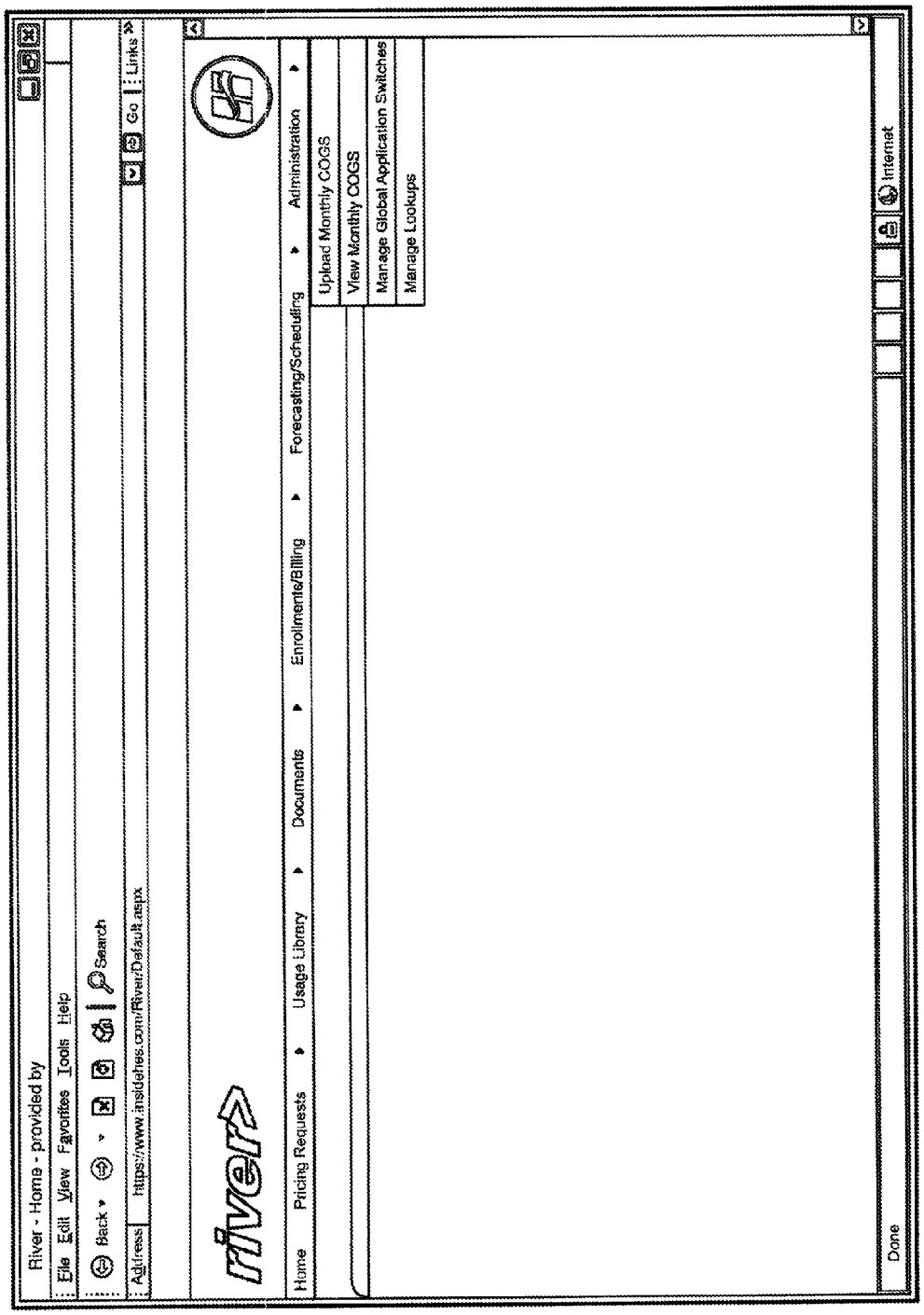
Figure 5T:
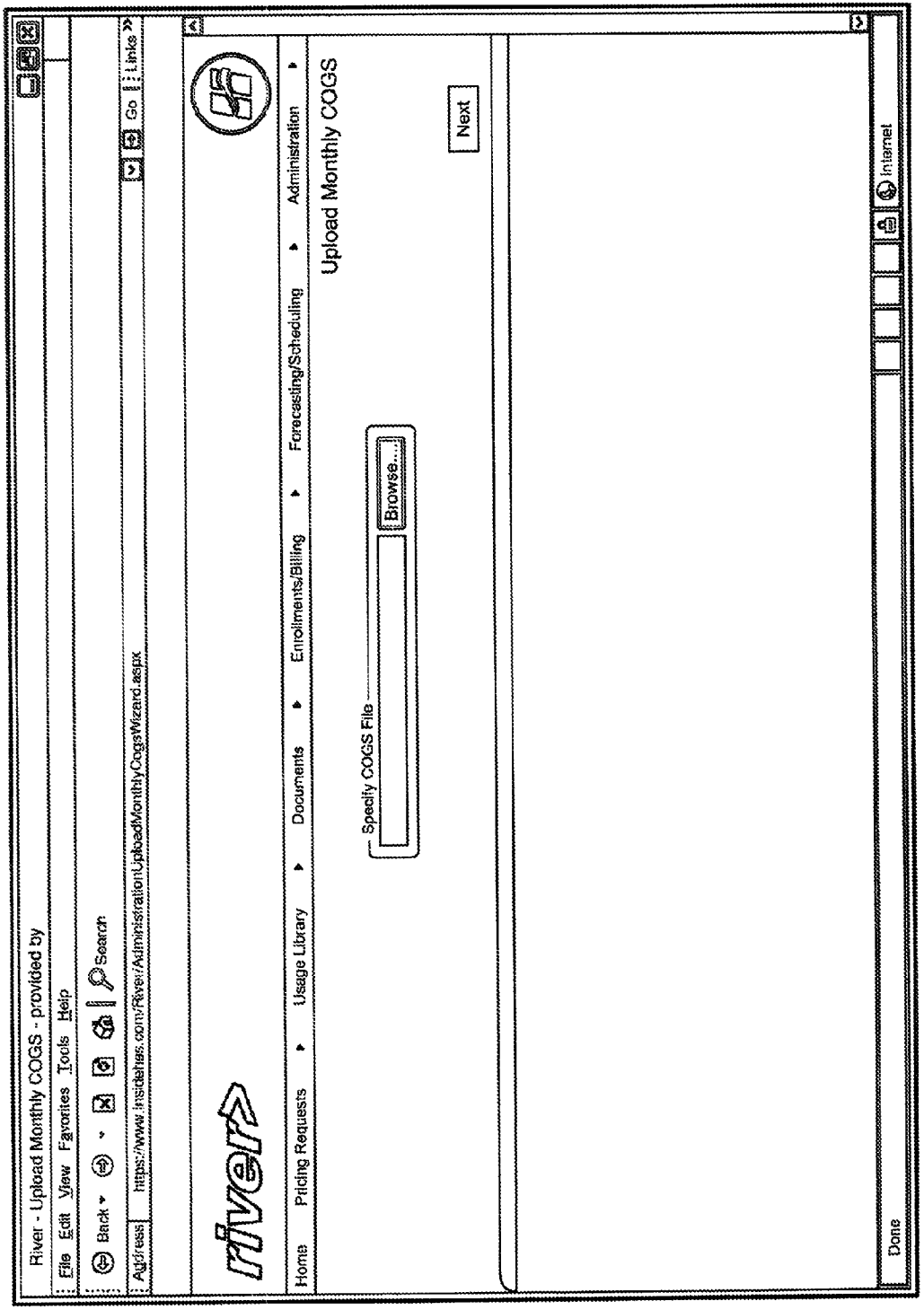
Figure 5U:
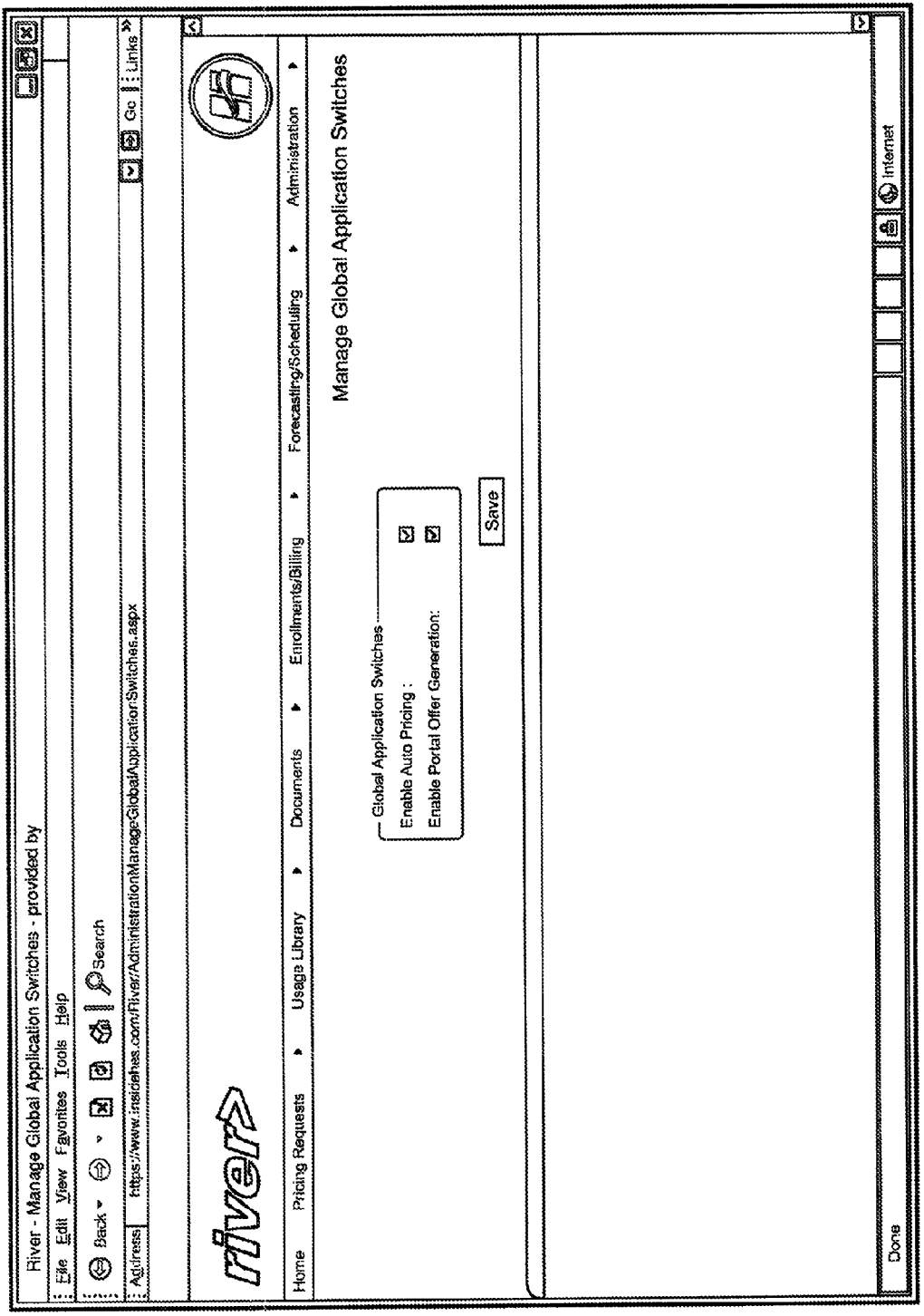

FIGS. 5A-5U are screen shots associated with various aspects of the pricing engine 242, hedge engine 244, report engine 246, and database 248. FIG. 5A is a screen shot of a pricing request administrator menu. FIGS. 5B-5D are screen shots of a pricing request creation GUI. FIG. 5E is a screen shot of a pricing request view. FIG. 5F is a screen shot of a list of batch jobs for automatic price updates. FIG. 5G is a screen shot of a GUI to adjust the margins for customers meeting certain criteria. FIG. 5H is a screen shot of a GUI to manage default margins. FIG. 5I is a screen shot of a usage library menu. FIG. 5J is a screen shot of a view of forecast data for a customer. FIG. 5K is a screen shot of a documents menu. FIG. 5L is a screen shot of a view of a list of documents associated with a particular customer. FIG. 5M is a screen shot of an enrollments/billing menu. FIG. 5N is a screen shot of an enrollment list. FIG. 5O is a screen shot of a GUI to convert a signed offer into a contract. FIG. 5P is a screen shot of an enrollment extract list. FIG. 5Q is a screen shot of a GUI for managing welcome packages. FIG. 5R is a screen shot of a forecasting/scheduling menu. FIG. 5S is a screen shot of an administration menu. FIG. 5T is a screen shot of a GUI for uploading COGS 230. FIG. 5U is a screen shot of a GUI for managing global application switches such as automatic pricing and portal offer generation.

Figure 6:
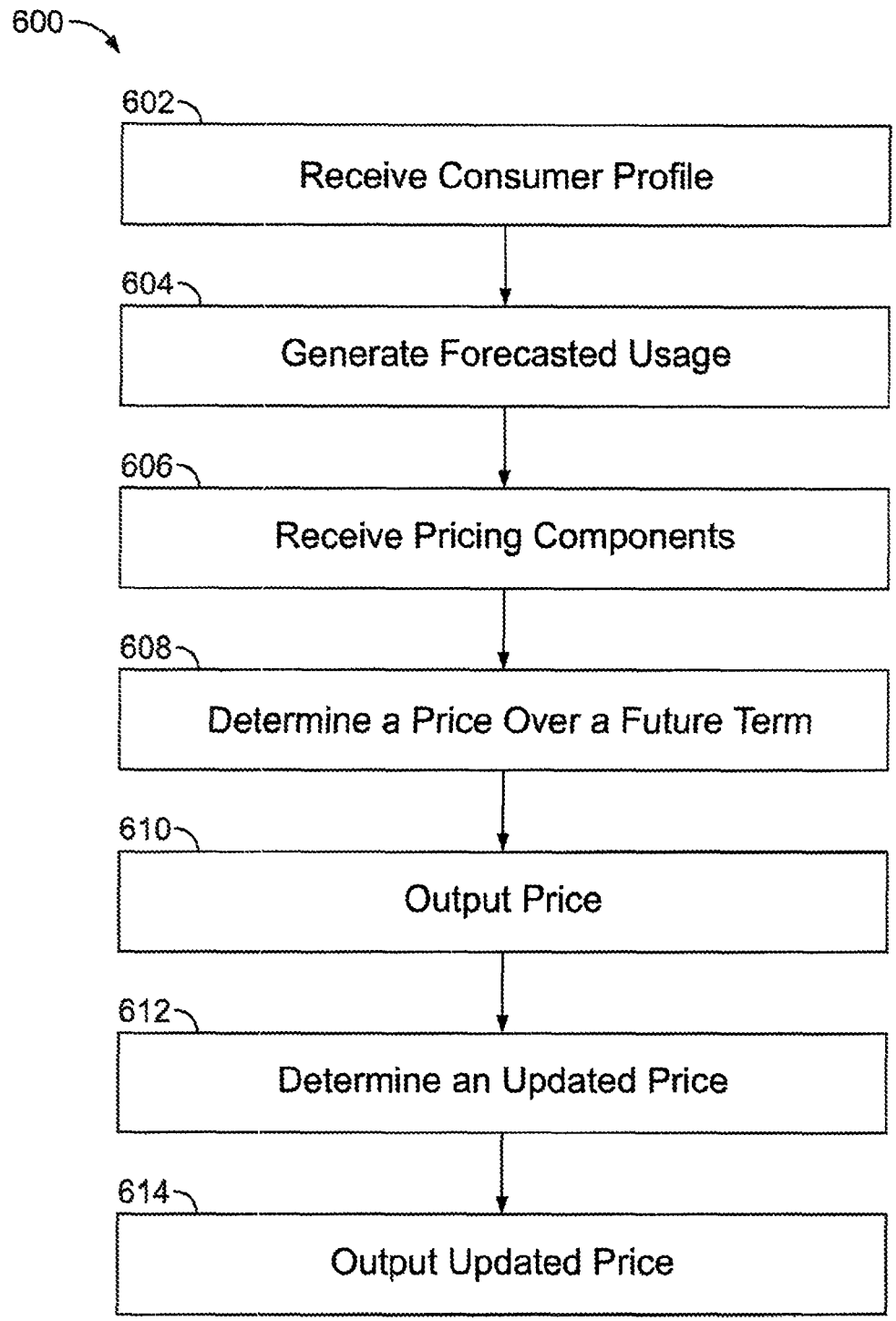
FIG. 6 is a flow chart of an example method for pricing energy for retail market and communicating pricing.

Turning now to FIG. 6, an example method for pricing energy 600 is shown. At operation 602, one or more consumer profiles are received. The consumer profiles are associated with the consumers set up on the system by the sales agent, and can contain information such as identifying information about the consumer, the number of premises that energy will be supplied to, the geographic location of these premises, usage history at these premises and/or other information, as well as information on pricing scenarios including pricing model (fixed/indexed/hybrid), start date, term and/or others that are desired to be priced for the consumer.

At operation 604, a forecasted usage is generated for a one or more consumers. As discussed above, a forecasted usage is generated corresponding to each consumer and may be determined from the on an off-peak usage of a consumer and may be generated for a specified maximum period.

At operation 606, pricing components used in determining the price for supplying energy are received. The pricing components can include information such as COGS, sales agent fees, retailer margin, and/or other components and can include information specific one or more consumer (including information in the consumer profiles). The COGS can be specific to the characteristics of consumer, including for example, a raw cost of energy and the cost to transport the energy to the consumer's location(s). In certain instances, the energy retailer will periodically upload updated COGS into the energy retail system and/or update other pricing components as changes in the pricing components occur.

At operation 608 the price is determined for supplying energy for one or more consumers over a future term for one or more pricing scenarios. As discussed above, the price can be tailored to each consumer, and based on information in the consumer profile, the forecasted usage for the consumer, pricing components (including COGS, sales agent fees, retailer margin) and/or other information. The pricing scenarios can provide for a fixed price pricing model, an indexed price pricing model, and/or a hybrid pricing model having a component of the price based on a fixed-price pricing model and a component of the price based on an indexed price pricing model. Operation 608 can be performed individually for each consumer, for example initially after the consumer profile and forecast are generated, or can be performed in a batch operation for a plurality of consumers selected by the energy retailer.

At operation 610, the price is output for one or more consumers. As discussed above, the price may be output in a number of manners. For example, the price may be displayed on the portal and/or may be communicated to the consumer or the sales agent via an e-mail or other electronic communication.

At operation 612, for example upon receipt of different or updated pricing components, updated prices are determined for supplying energy for one or more consumers over future term for one or more pricing scenarios.

At operation 614, the updated price is output for one or more consumers.

The preceding flowchart and accompanying description illustrates example method 600. It will be understood that this illustrated method is for example purposes only and that the described or similar techniques or processes may be performed at any appropriate time, including concurrently, individually, or in combination. In addition, many of the steps in the flowchart may take, place simultaneously and/or in different orders than as shown. Moreover, methods may be used with additional steps, fewer steps, and/or different steps, so long as the methods remain appropriate. Also, as discussed above, one or more of the operations can be performed automatically.

The terms customers and consumers, as used throughout this specification, should be interpreted as interchangeable. Customers and consumers are entities that buy and/or use energy from retail energy providers. A customer or consumer may be a composite entity that includes multiple sites or buildings each having a separate utility connection. In such cases, each site or building having a separate utility connection may be viewed as separate customers or consumers, or each site or building could be aggregated and viewed as a single customer or consumer.

A number of embodiments of the invention have been described. Nevertheless, it will be understood that various modifications may be made without departing from the spirit and scope of the invention. Accordingly, other embodiments are within the scope of the following claims.

What is claimed is:

1. A computerized method of pricing energy, the method comprising the following steps performed by one or more processors:
   determining, by at least one processor, a first contract price offering for supplying energy to a consumer over a future term based on at least a forecasted cost of energy to be supplied over the future term and a forecasted energy usage of the consumer during the future term;
   receiving, prior to acceptance of the contract price offering, an updated forecasted cost of energy to be supplied over the future term;
   automatically in response to receiving the updated forecasted cost of energy to be supplied over the future term, determining, by at least one processor, an updated contract price offering for supplying energy to be supplied over the future term based on at least the forecasted energy usage of the consumer during the future term used in determining the first contract price offering and the updated forecasted cost of energy to be supplied over the future term; and
   outputting the updated contract price offering for supplying energy to the consumer over the future term.

2. The method of claim 1, wherein determining the first contract price offering for supplying energy to a consumer over a future term is based on at least the forecasted cost of energy to be supplied over the future term, the forecasted energy usage of the consumer during the future term, and a margin; and
   wherein determining the updated contract price offering for supplying energy to be supplied over the future term is based on the forecasted energy usage of the consumer used in determining the first contract price offering, the updated forecasted cost of energy to be supplied over the future term, and a changed margin.

3. The method of claim 1, wherein the forecasted cost of energy to be supplied over the future term comprises both a forecasted raw cost of energy during the future term and a forecasted cost to provide the energy to the consumer during the future term.

4. The method of claim 1, wherein automatically determining an updated contract price offering for supplying energy over the future term comprises determining an updated contract price offering for supplying energy over the future term without updating the forecasted energy usage over the future term.

5. The method of claim 1, wherein determining the contract price offering for supplying energy over the future term comprises determining a fixed price per unit of energy over the future term.

6. The method of claim 1, wherein determining the contract price offering for supplying energy over the future term comprises determining a hybrid price for supplying energy over the future term including a fixed price component having a fixed price per unit of energy over the future term and an indexed component having a price determined based on a market price of energy contemporaneous with consumption of the energy over the future term.

7. The method of claim 1, further comprising:
   receiving data representative of the consumer's energy usage;
   automatically generating the forecasted energy usage of the consumer during the future term based on the consumer's energy usage; and
   wherein determining the contract price offering for supplying energy to the consumer over the future term is performed automatically.

8. The method of claim 1, wherein determining the contract price offering for supplying energy to a consumer over a future term based on at least a forecasted cost of energy to be supplied over the future term and a forecasted energy usage of the consumer during the future term further comprises determining a plurality of contract price offerings for supplying energy to the consumer over the future term, each contract price associated with a different pricing scenario; and
   wherein automatically determining the updated contract price offering for supplying energy over the future term based on at least the forecasted energy usage of the consumer used in determining the first contract price further comprises automatically determining a plurality of updated contract price offerings for supplying energy to the consumer over the future term, each updated contract price associated with a different pricing scenario.

9. The method of claim 1, wherein outputting the updated contract price offering for supplying energy over the future term comprises offering to contract to supply energy to the consumer over the future term at the updated price.

10. The method of claim 1, wherein outputting the contract price offerings for supplying energy over the future term comprises:
    generating a transactable energy contract for a particular consumer based at least on the automatically determined updated contract price offering for supplying energy over the future term; and
    presenting the transactable energy contract to the particular consumer for immediate acceptance through a portal.

11. A system for pricing energy, comprising:
    a pricing engine, including a hardware processor and a set of instructions, the instructions operable when executed by the hardware processor to:
      determine a first contract price offering for supplying energy to a consumer over a future term based on at least a forecasted cost of energy to be supplied over the future term and a forecasted energy usage of the consumer during the future term;
      receive, prior to acceptance of the contract price offering, an updated forecasted cost of energy to be supplied over the future term; and
      automatically in response to receiving the updated forecasted cost of energy to be supplied over the future term, determine an updated contract price offering for supplying energy to be supplied over the future term based on at least the forecasted energy usage of the consumer during the future term used in determining the first contract price offering and the updated forecasted cost of energy to be supplied over the future term; and
    an interface operable to output the first contract price offering for supplying energy to the consumer over the future term and the updated contract price offering for supplying energy over the future term.

12. The system of claim 11, wherein the pricing engine is operable to:
    determine the contract price offering for supplying energy to a consumer over a future term based on at least the forecasted cost of energy to be supplied over the future term, the forecasted energy usage of the consumer during the future term, and a margin; and determine the updated contract price offering for supplying energy to the consumer over the future term based on the forecasted energy usage of the consumer used in determining the first contract price offering, the updated forecasted cost of energy to be supplied over the future term, and a changed margin.

13. The system of claim 11, wherein the forecasted cost of energy to be supplied over the future term comprises both a forecasted raw cost of energy to be supplied over the future term and a forecasted cost to provide the energy to the consumer over the future term.

14. The system of claim 11, wherein automatically updating the contract price offering for supplying energy over the future term comprises updating the contract price offering for supplying energy over the future term without updating the forecasted energy usage during the future term.

15. The system of claim 11, wherein the pricing engine is further operable to:
receive data representative of the consumer's energy usage;
automatically generate the forecasted energy usage of the consumer during the future term based on the consumer's energy usage; and
automatically determine the contract price offering for supplying energy to the consumer over the future term.

16. The system of claim 11, wherein the interface is operable to output the contract price offering for supplying energy over the future term as an executable contract to supply energy to the consumer over the future term at the updated price.

17. The system of claim 11, wherein the pricing engine is further operable to automatically determine a plurality of contract price offerings for supplying energy over the future term, each price determined for a different energy consumer and based at least on a forecasted cost of energy supplied over the future term and a forecasted energy usage during the future term of the consumer.

18. The system of claim 11, wherein the interface comprises a portal; and wherein the pricing engine is further operable to:
generate a transactable energy contract for a particular consumer based at least on the automatically determined updated contract price offering for supplying energy over the future term; and
present the transactable energy contract to the particular consumer for immediate acceptance through the portal.

19. A non-transitory computer readable media having instructions for a processor for performing operations comprising:
determining a contract price offering for supplying energy to a consumer over a future term based on at least a forecasted cost of energy and a forecasted energy usage of the consumer;
receiving an updated forecasted cost of energy;
automatically in response to receiving the updated forecasted cost of energy to be supplied over the future term, determining an updated contract price offering for supplying energy to be supplied over the future term based on at least the forecasted energy usage of the consumer used in determining the first contract price offering and the updated forecasted cost of energy to be supplied over the future term; and
outputting the contract price offering for supplying energy to the consumer over the future term and the updated contract price offering for supplying energy to the consumer over the future term.

20. The computer readable media of claim 19, wherein the operations further comprise:
receiving data representative of the consumer's energy usage;
automatically generating the forecasted energy usage of the consumer during the future term based on the consumer's energy usage; and
automatically determining the contract price offering for supplying energy to the consumer over the future term.

21. The computer readable media of claim 19, wherein the operations further comprise automatically determining a plurality of contract price offerings for supplying energy during the future term, each contract price offering determined for a different energy consumer and based at least on a forecasted cost of energy to be supplied over the future term and a forecasted energy usage during the future term of the consumer.

22. The computer readable media of claim 19, wherein determining the contract price offering for supplying energy over the future term comprises determining a hybrid price for the contract price offering including a fixed price component having a fixed price per unit of energy over the term and an indexed component having a price determined based on a market price of energy contemporaneous with consumption of the energy.

23. The computer readable media of claim 19, wherein outputting the contract price offering for supplying energy and the updated contract price offering for supplying energy comprises:
generating a transactable energy contract for a particular consumer based at least on the automatically determined updated contract price offering for supplying energy over the future term; and
presenting the transactable energy contract to the particular consumer for immediate acceptance through a portal.

* * * * *